(12) United States Patent
Jacobs et al.

(10) Patent No.: US 10,938,564 B2
(45) Date of Patent: Mar. 2, 2021

(54) ACCESS CONTROL FOR DATA IN A DISTRIBUTED LEDGER SYSTEM

(71) Applicant: Optum, Inc., Minnetonka, MN (US)

(72) Inventors: Michael N. Jacobs, Jordan, MN (US); Matt Nichols, Buffalo, MN (US); Rick A. Hamilton, Charlottesville, VA (US); Steven S. Ruckdashel, Cologne, MN (US); Rajeev Cyrus, Minneapolis, MN (US)

(73) Assignee: Optum, Inc., Minnetonka, MN (US)

( * ) Notice: Subject to any disclaimer, the term of this patent is extended or adjusted under 35 U.S.C. 154(b) by 218 days.

(21) Appl. No.: 16/203,964

(22) Filed: Nov. 29, 2018

(65) Prior Publication Data
US 2020/0099523 A1   Mar. 26, 2020

Related U.S. Application Data

(60) Provisional application No. 62/735,628, filed on Sep. 24, 2018.

(51) Int. Cl.
*H04L 29/06*      (2006.01)
*H04L 9/32*       (2006.01)
(Continued)

(52) U.S. Cl.
CPC ........... *H04L 9/3213* (2013.01); *G06F 21/62* (2013.01); *G06Q 20/065* (2013.01);
(Continued)

(58) Field of Classification Search
CPC ... H04L 9/3231; H04L 9/0637; H04L 9/0861; G06F 21/62; G06Q 20/0265
See application file for complete search history.

(56) References Cited

U.S. PATENT DOCUMENTS

| 8,775,303 | B2 * | 7/2014 | Higgins | G06F 16/245 |
| | | | | 705/39 |
| 8,983,976 | B2 | 3/2015 | Paruchuri et al. | |

(Continued)

OTHER PUBLICATIONS

Shrestha et al., Blockchain-Based Research Data Sharing Framework for Incentivizing the Data Owners, International Conference on Blockchain—ICBC 2018, Lecture Notes in Computer Science, vol. 10974. Springer, pp. 259-266.
(Continued)

*Primary Examiner* — Sher A Khan
(74) *Attorney, Agent, or Firm* — Alston & Bird LLP

(57) ABSTRACT

A technical solution for providing data associated with a predetermined, finite lifetime for access via a distributed ledger is provided. A member computing entity receives a submission provided by a supplying member computing entity associated with a supplying member of a distributed ledger; generates a token and attributing the token to a member account corresponding to the supplying member; attributes a value to the token; and makes the submitted instance of data available for access via the distributed ledger. The submission comprises a submitted instance of data. The submitted instance of data (a) is configured to be provided to a consuming member computing entity via the distributed ledger and (b) is associated with a predetermined lifetime. The value of the token changes with time based on (a) a remaining lifetime of the submitted instance of data, (b) a depreciation policy/protocol corresponding to the distributed ledger, or (c) both.

20 Claims, 8 Drawing Sheets

(51) Int. Cl.
| | |
|---|---|
| H04L 9/06 | (2006.01) |
| H04L 9/08 | (2006.01) |
| G06F 21/62 | (2013.01) |
| G06Q 20/06 | (2012.01) |
| G06Q 20/38 | (2012.01) |

(52) U.S. Cl.
CPC ..... *G06Q 20/38215* (2013.01); *H04L 9/0637* (2013.01); *H04L 9/0861* (2013.01)

(56) References Cited

U.S. PATENT DOCUMENTS

| | | | | |
|---|---|---|---|---|
| 2010/0235882 | A1* | 9/2010 | Moore | H04L 63/0807 726/3 |
| 2016/0087833 | A1* | 3/2016 | Donahue | G06F 16/278 709/221 |
| 2017/0098291 | A1* | 4/2017 | Code | G06Q 50/188 |
| 2017/0214522 | A1* | 7/2017 | Code | G06Q 20/3672 |
| 2017/0221288 | A1* | 8/2017 | Johnson | G07C 9/257 |
| 2017/0278127 | A1* | 9/2017 | Smrzlic | G06Q 20/342 |
| 2018/0158000 | A1* | 6/2018 | Fredette | G06Q 30/0601 |
| 2019/0319968 | A1* | 10/2019 | Mehta | H04L 63/1416 |
| 2020/0053088 | A1* | 2/2020 | Drake, II | H04L 63/105 |

OTHER PUBLICATIONS

Pazaitis et al., Blockchain and Value Systems in the Sharing Economy: The Illustrative Case of Backfeed, Technological Forecasting and Social Change Journal, vol. 125, Dec. 2017, pp. 105-115, [retrieved Apr. 19, 2019], [retrieved Apr. 19, 2019], retrieved from the Internet <URL: https://www.sciencedirect.com/science/article/pii/S0040162517307084?via%3Dihub>.

Knowledge Sharing Across Organisations (II): How Blockchains Provide Incentives to Jointly Solve Business and Social Problems in the Digital World, [online], Aug. 24, 2018, 1 page, retrieved Apr. 19, 2019], [retrieved Apr. 19, 2019], retrieved from the Internet <URL: https://www.cambridgedigitalinnovation.org/single-post/2018/08/24/Knowledge-sharing-across-organisations-II-How-blockchains-provide-incentives-to-jointly-solve-business-and-social-problems-in-the-digital-world>.

DATAEUM—The Next Data Revolution, [online], Sep. 4, 2018, pp. 1-18, [retrieved Apr. 19, 2019], [retrieved Apr. 19, 2019], retrieved from the Internet <URL: https://dataeum.io/>.

Dao et al., DATABRIGHT: A Data Curation Platform for Machine Learning Based on Markets and Trusted Computation, Game—Theoretic Mechanisms for Data and Information Workshop, Jul. 14, 2018, 4 pages, [retrieved Apr. 19, 2019], [retrieved Apr. 19, 2019], retrieved from the Internet <URL: https://gradanovic.github.io/gtmdi18ws/accepted_papers.html>.

* cited by examiner

ACCESS CONTROL FOR DATA IN A DISTRIBUTED LEDGER SYSTEM

CROSS-REFERENCE TO RELATED APPLICATIONS

This application claims priority to U.S. Application No. 62/735,628, filed Sep. 24, 2018, the content of which is hereby incorporated by reference herein in its entirety.

FIELD

Various embodiments relate generally to distributed ledgers and processes and/or protocols for updating distributed ledgers. For example, an example embodiment assigns a time dependent value for information/data supplied to and/or accessed from a distributed ledger.

BACKGROUND

Distributed ledgers are data stores that are stored by a plurality of nodes that may be geographically remote with respect to one another. Instances of information/data, may be posted to the distributed ledger and accessed from the distributed ledger by one or more members of the distributed ledger. In various scenarios, an instance of information/data may only be valid for a period of time. For example, one or more details corresponding to the instance of information/data may not be correct and/or have the potential to be incorrect after a period of time. Thus, it is important for details of instances of information/data to be validated, checked, and/or resubmitted periodically.

BRIEF SUMMARY OF SOME EXAMPLE EMBODIMENTS

Various embodiments provide methods, apparatuses, computer program products, systems, and/or the like that provide for a distributed ledger that incorporates time dependent tokens. The tokens may be used to reward members for submitting and/or validating instances of information/data. The tokens may be also be used to access information/data from the distributed ledger. Various embodiments provide methods, apparatuses, computer program products, systems, and/or the like that provide for a distributed ledger that incorporates time dependent value of instances of information/data. In various embodiments, the time dependency of the tokens used to reward members for submitting and/or validating instances of information/data and/or the time dependency of the value of an instance of information/data may be determined based on the timeliness of the instance of information/data and/or a depreciation policy/protocol of the distributed ledger.

In various embodiments, a supplying member may submit one or more instances of information/data and be rewarded with corresponding tokens. One or more validating members may review an instance of information/data to assure that the details of the instance of information/data valid, correct, and/or the like. In an example embodiment, the one or more validating members may be rewarded with corresponding tokens for validating an instance of information/data. In an example embodiment, a consuming member may access an instance of information/data. The consuming member may exchange one or more tokens having a value of at least the time dependent data access cost for the instance of information/data. The value exchanged by the consuming member to access the instance of information/data may be used to provide redeemable value to the tokens provided to the supplying member and/or the validating members. In an example embodiment, an initial value is attributed to the tokens provided to the supplying member for submitting the instance of information/data and/or validating members for validating the instance of information/data but the token does not have a redeemable value until the instance of information/data is accessed by a consuming member. In an example embodiment, an initial value is attributed to the tokens provided to the supplying member for submitting the instance of information/data and/or validating members for validating the instance of information/data when the assurance level associated with the instance of information/data reaches a threshold level and the instance of information/data is made available for access via the distributed ledger.

According to an aspect of the present invention, a method for providing data associated with a predetermined/configurable, finite lifetime for access via a distributed ledger is provided. The method comprises receiving an instance of data to which access can be provided in a distributed ledger system, the instance of data (a) submitted by a supplying member computing entity corresponding to a supplying member, (b) configured to be provided to and/or accessed by a consuming member computing entity corresponding to a consuming member, and (c) associated with a configurable time to live; generating a supplier token for the instance of data; attributing the supplier token for the instance of data to an account corresponding to the supplying member; attributing a value to the supplier token, wherein the value of the supplier token changes with time based on (a) a remaining time to live of the configurable time to live, (b) a depreciation protocol corresponding to the distributed ledger system, or (c) a combination of the remaining time to live of the configurable time to live and the depreciation protocol corresponding to the distributed ledger system; and enabling, based at least in part on the value of the supplier token, access to the instance of data via the distributed ledger system.

According to another aspect of the present invention, an apparatus is provided. In an example embodiment, the apparatus comprises at least one processor, at least one communications interface, and at least one memory including computer program code. The apparatus is a node of a plurality of nodes of a distributed ledger. The at least one memory and computer program code are configured to, with the processor, cause the apparatus to at least receive an instance of data to which access can be provided in a distributed ledger system, the instance of data (a) submitted by a supplying member computing entity corresponding to a supplying member, (b) configured to be provided to and/or accessed by a consuming member computing entity corresponding to a consuming member, and (c) associated with a configurable time to live; generate a supplier token for the instance of data; attribute the supplier token for the instance of data to an account corresponding to the supplying member; attribute a value to the supplier token, wherein the value of the supplier token changes with time based on (a) a remaining time to live of the configurable time to live, (b) a depreciation protocol corresponding to the distributed ledger system, or (c) a combination of the remaining time to live of the configurable time to live and the depreciation protocol corresponding to the distributed ledger system; and enable, based at least in part on the value of the supplier token, access to the instance of data via the distributed ledger system.

According to yet another aspect of the present invention, a computer program product is provided. In an example embodiment, the computer program product comprises at least one non-transitory computer-readable storage medium having computer-executable program code portions stored therein. The computer program code instructions, when executed by a processor of a member computing entity, the member computing entity being a node of a distributed ledger, are configured to cause the member computing entity to at least receive an instance of data to which access can be provided in a distributed ledger system, the instance of data (a) submitted by a supplying member computing entity corresponding to a supplying member, (b) configured to be provided to and/or accessed by a consuming member computing entity corresponding to a consuming member, and (c) associated with a configurable time to live; generate a supplier token for the instance of data; attribute the supplier token for the instance of data to an account corresponding to the supplying member; attribute a value to the supplier token, wherein the value of the supplier token changes with time based on (a) a remaining time to live of the configurable time to live, (b) a depreciation protocol corresponding to the distributed ledger system, or (c) a combination of the remaining time to live of the configurable time to live and the depreciation protocol corresponding to the distributed ledger system; and enable, based at least in part on the value of the supplier token, access to the instance of data via the distributed ledger system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
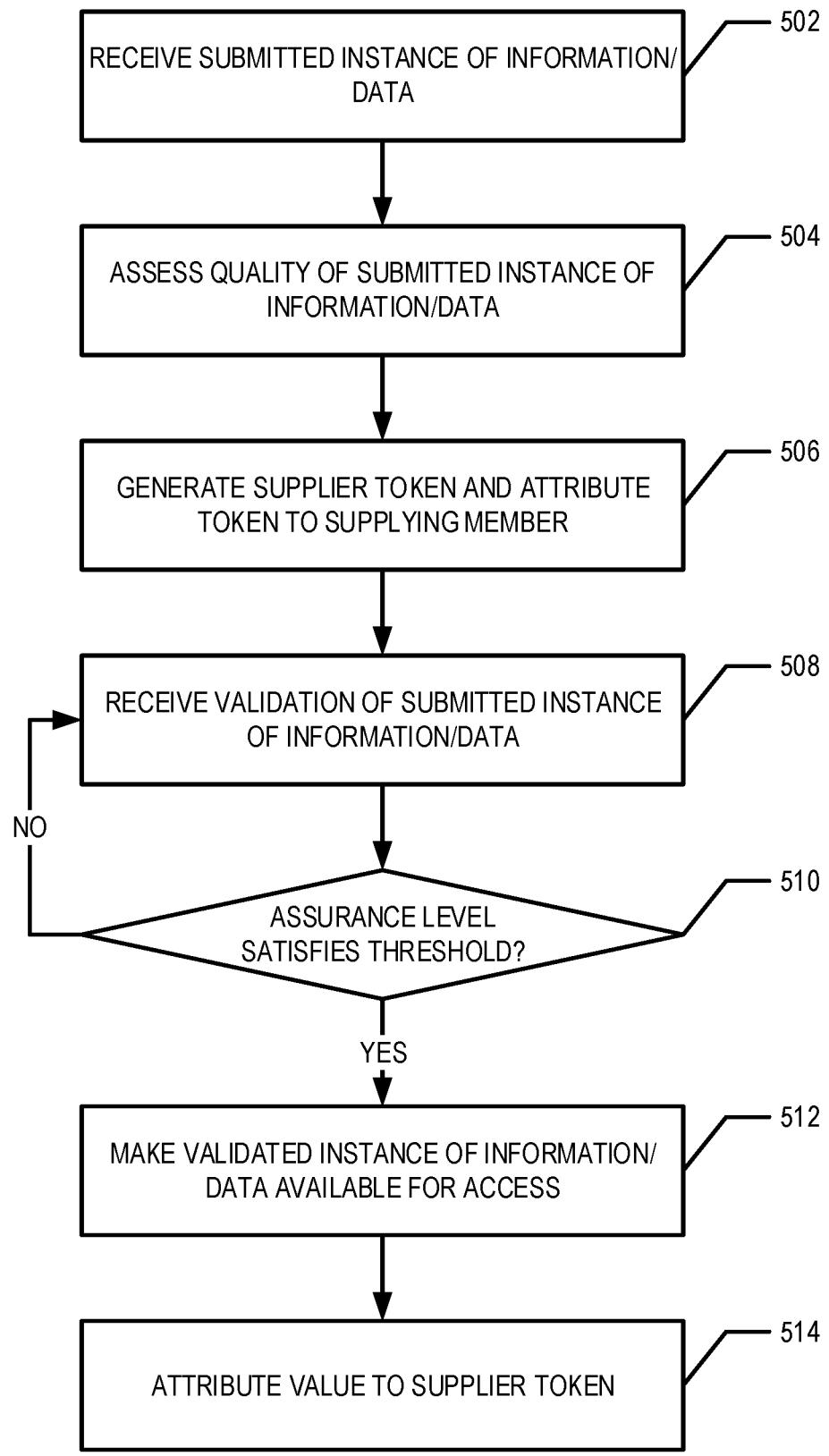
Figure 6:
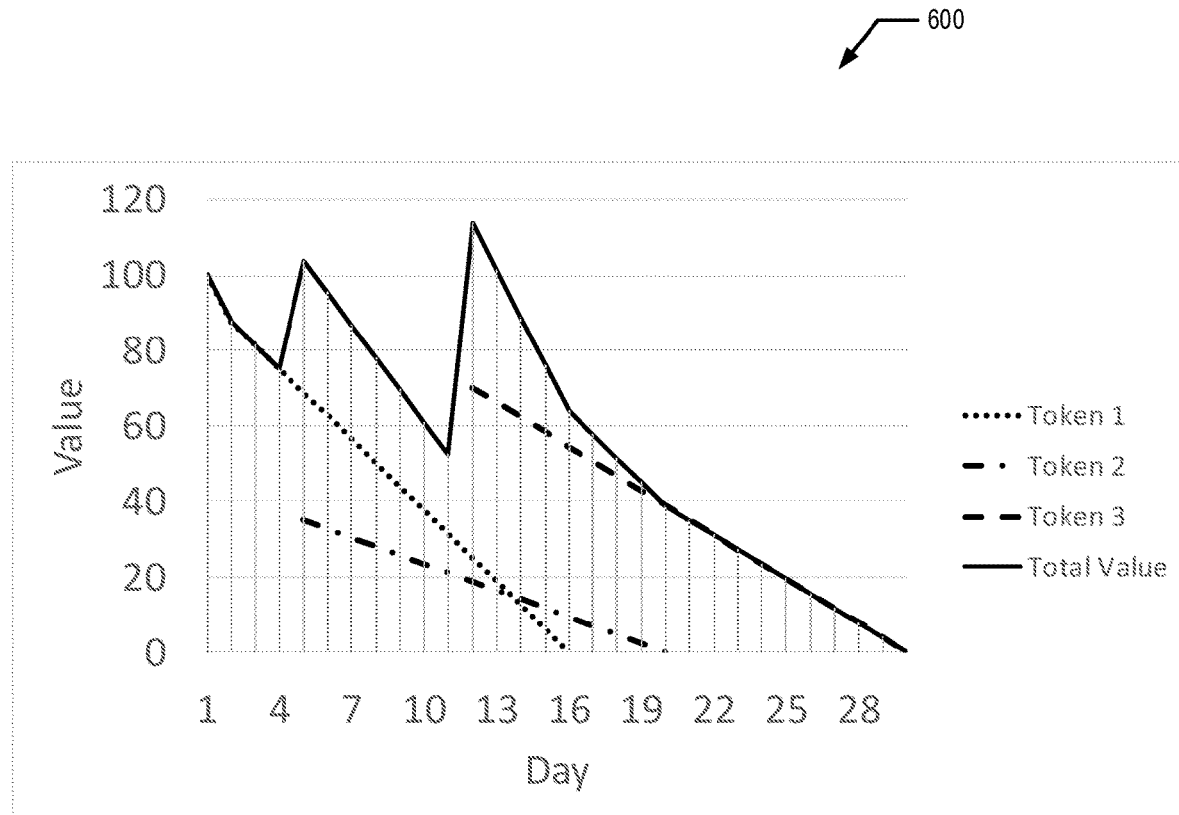
Figure 7:
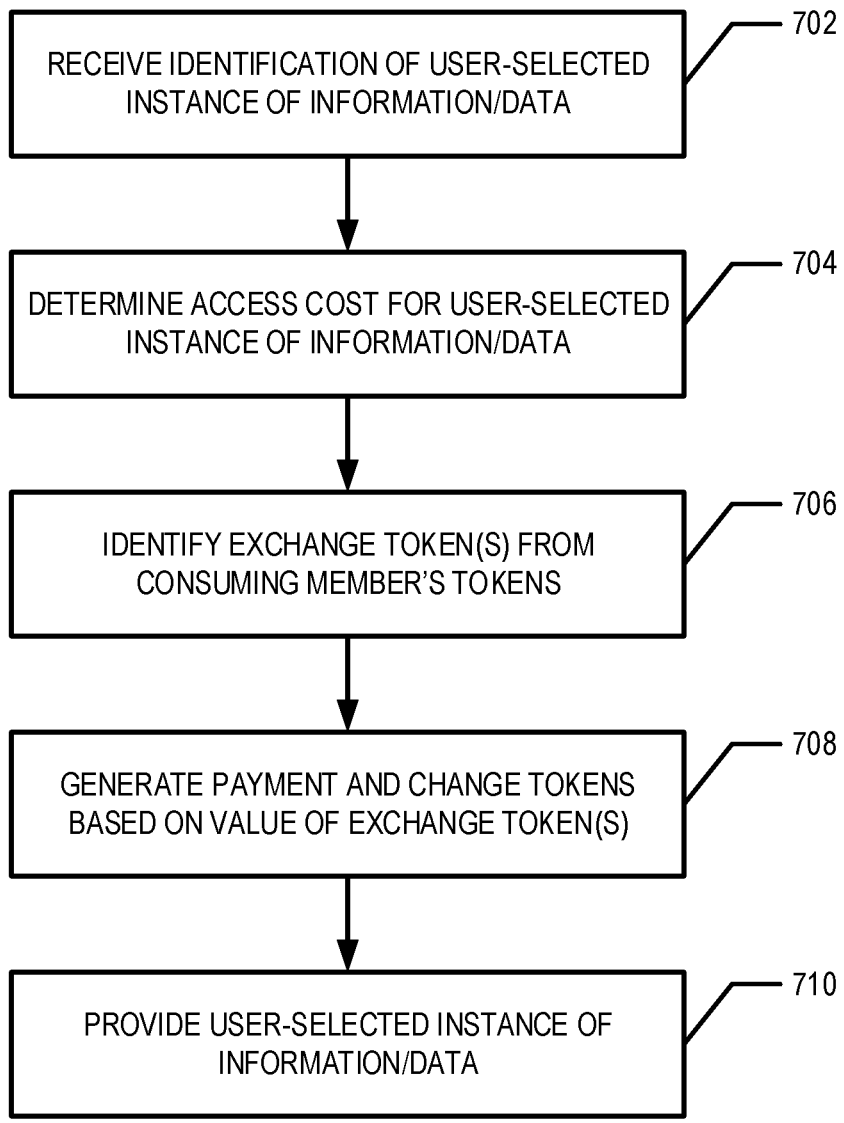

FIG. 5 provides a flowchart illustrating processes, procedures, operations, and/or the like for making an instance of information/data available via the distributed ledger, in accordance with an example embodiment of the present invention;

FIG. 6 illustrates an example of the value of an example member's tokens over a thirty day time period, according to an example embodiment; and FIG. 7 provides a flowchart illustrating processes, procedures, operations, and/or the like for providing access to an instance of information/data via the distributed ledger, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. General Overview

Various embodiments relate to the sharing and use of time sensitive information/data within a distributed ledger in accordance with a common good scenario (e.g., an open access problem and/or tragedy of the commons scenario). A blockchain system is particular implementation of a distributed ledger system—the terms blockchain, blockchain system, distributed ledger, distributed ledger system, and/or the like are used herein interchangeably. In various embodiments, methods, systems, apparatuses, computer program products, and/or the like are provided for a distributed ledger that allows for a time dependent value for an instance of information/data. A supplying member may be rewarded with a token attributed with a value that is time dependent. For example, the redeemable value of a token at a particular point in time may be determined based on the time dependent value for an instance of information/data submitted by the supplying member. A validating member may be rewarded with a token attributed with a value determined based on the time dependent value for the instance of information/data validated by the validating member. In an example embodiment, the value attributed to the token provided to the validating member may be determined based on a sharing plan submitted by the supplying member who submitted the instance of information/data. In an example embodiment, a consuming member may exchange one or more tokens to gain access to an instance of information/data via the distributed ledger. In an example embodiment, the one or more tokens exchanged by the consuming member amount to a time dependent data access cost that is determined based on the time dependent value of an instance of information/data accessed via the distributed ledger by the consuming member. In various embodiment, a token encapsulates the owner of the token (e.g., the member the token was attributed to), the value of the token (e.g., which may be a fraction of the value of an instance of information/data corresponding to the token), the lifetime (or time to live (TTL)) of the token (e.g., when the token expires and/or the value of the token reaches zero), and/or the like.

In various embodiments, a distributed ledger is a data store that is stored by a plurality of nodes that may be geographically separated. In various embodiments, each node of a distributed ledger may comprise one or more node computing entities. The copies of the distributed ledger are stored by the plurality of nodes of the distributed leger. To ensure the validity of instances of information/data stored in the distributed ledger, to ensure transactions and/or value exchanges are properly and appropriately carried out, and/or to ensure that events (e.g., instances of information/data, transactions and/or value exchanges, and/or the like) written to the distributed ledger are in the appropriate format, a consensus process may be used. Once an instance of information/data has been written to the distributed ledger and, in some embodiments, has an assurance level that satisfies an quality assurance threshold requirement (e.g., has an assurance level that exceeds or that is greater than or equal to a quality assurance threshold) then the instance of information/data is available to be accessed by one or more consuming members of the distributed ledger.

Various embodiments ensure that the details of instances of information/data made available for access via a distributed ledger are valid. In various embodiments, the details of instances of information/data may be expected to change within a particular time period, have the possibility of changing within a particular time period, require re-validation after a particular time period (e.g., as dictated by relevant rules and regulations), and/or the like. Thus, the value of an instance of information/data may be determined to be time dependent based on the remaining lifetimes of the instances of information/data and/or a depreciation policy/protocol of the distributed ledger. In an example embodiment, the remaining lifetime of an instance of information/data is the amount of time left before the end of the particular time period. For example, based on relevant regulation, a detail of an instance of information/data may need to be re-validated every six months. If there are two months left before the instance of information/data needs to be re-validated, it may be determined that the value of that instance of information/data is lower than when there were four months left before the instance of information/data needed to be re-validated. In another example, a practitioner may need to renew their license once a year thus, it is possible for the practitioner's license status to change once a year (e.g., around the time the previous year's license expires). Thus, an instance of information/data that indicates that the practitioner renewed their license a month ago may therefore have a higher value than an instance of information/data that indicates that the practitioner renewed their license ten months ago. However, the time dependent value of the instances of information/data raises a technical problem of managing time dependent rewards and/or data access costs within the distributed ledger. Example embodiments provide a technical solution to this technical problem that is necessarily rooted in the computer networks and distributed ledgers.

In an example embodiment, a supplying member may interact with the distributed ledger via a supplying computing entity, a validating member may interact with the distributed ledger via a validating computing entity, and a consuming member may interact with the distributed ledger via a consuming computing entity. In various embodiments, a supplying computing entity, validating computing entity, and/or consuming computing entity are nodes of the distributed ledger. In an example embodiment, a user (e.g., a human user or an automated machine user such as an application) may operate a user computing entity to interact with a supplying computing entity, validating computing entity, and/or consumer computing entity to supply validate, and/or consume instances of information/data. In an example first scenario a first member may be a supplying member, in an example second scenario, the first member may be a consuming member, and in an example third scenario, the first member may be a validating member. In an example embodiment, the distributed ledger is a blockchain.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to step/operation diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

Figure 1A:
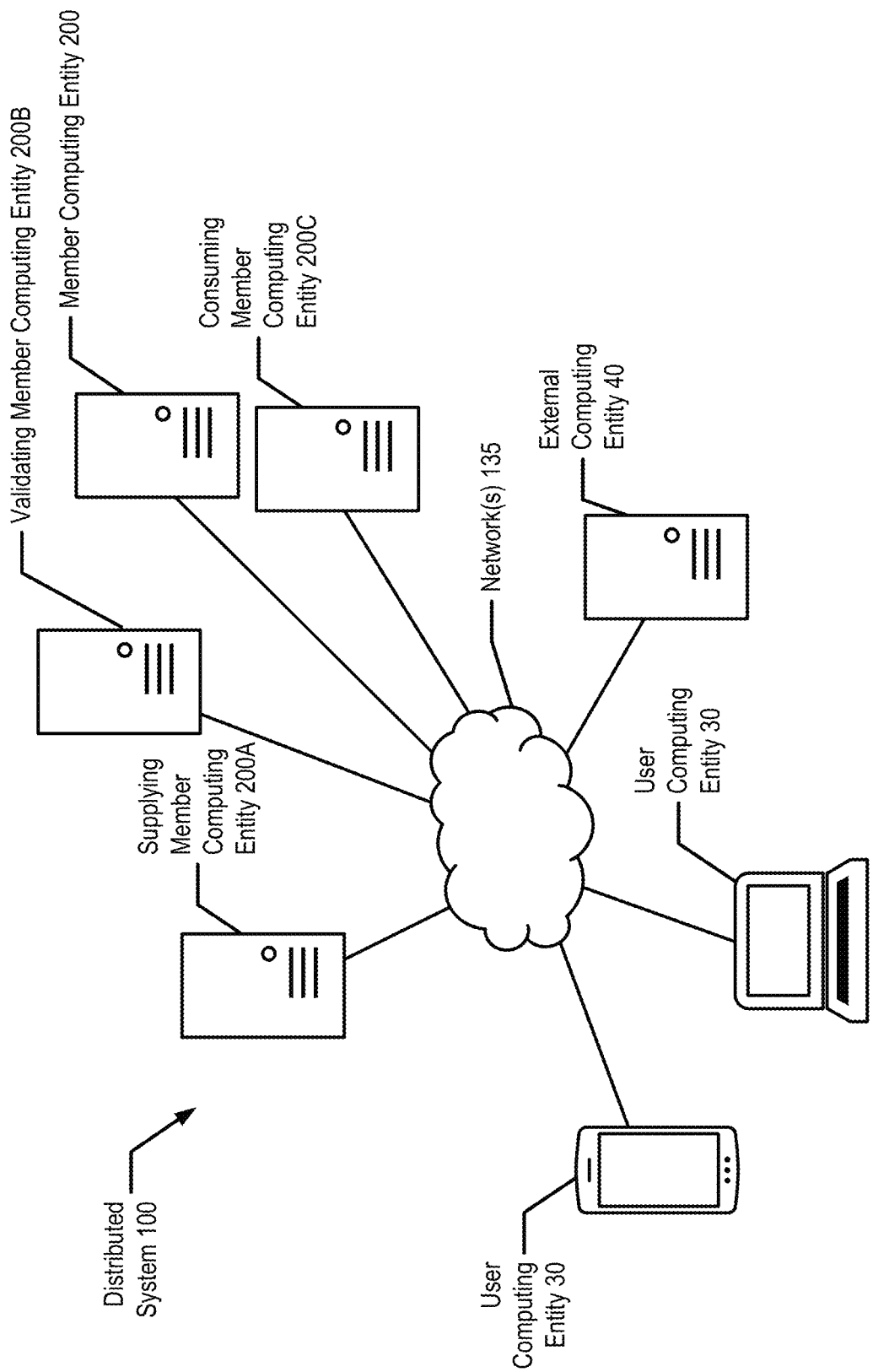
FIG. 1A is a diagram of a system that can be used to practice various embodiments of the present invention.
Figure 1B:
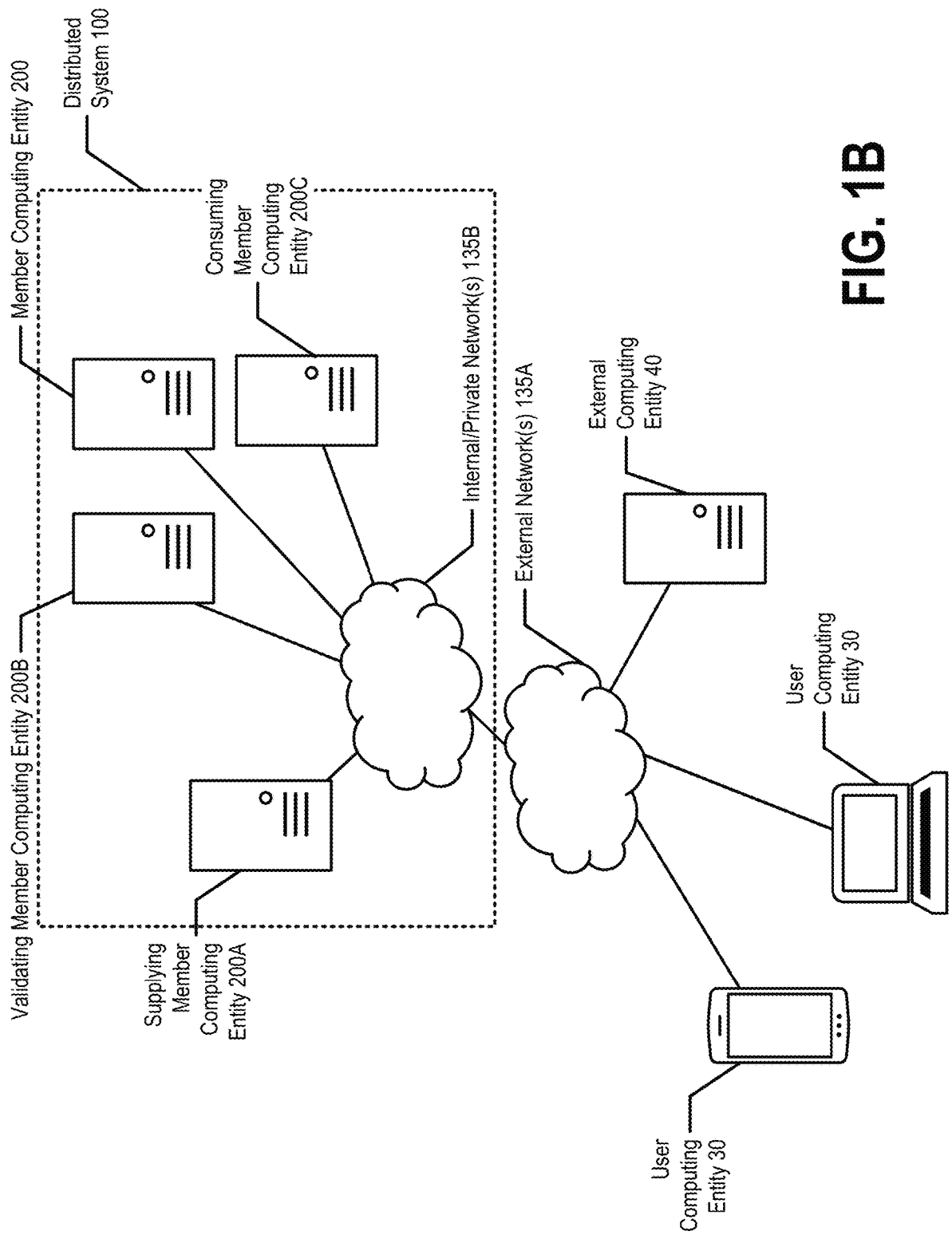
FIG. 1B is a diagram of another system that can be used to practice various embodiments of the present invention.

FIG. 1A provides an illustration of a system that can be used in conjunction with various embodiments of the present invention. As shown in FIG. 1A, the system may comprise a distributed system 100 comprising a plurality of member computing entities 200 (e.g., supplying member computing entity 200A, validating member computing entity 200B, consuming member computing entity 200C). In various embodiments, two or more of the plurality of member computing entities 200 are nodes of the distributed ledger of the distributed system 100. As shown in FIG. 1A, the system may further comprise one or more user computing entities 30, one or more external computing entities 40, one or more networks 135, and/or the like. FIG. 1B provides an illustration of another system that can be used in conjunction with various embodiments of the present invention. As shown in FIG. 1B, the system may comprise a distributed system 100 comprising a plurality of member computing entities 200, 200' (e.g., supplying member computing entity 200A, validating member computing entity 200B, consuming member computing entity 200C) and one or more internal networks 135B. For example, in an example embodiment, the distributed system 100 comprises a two or more member computing entities 200, 200' in communication with one another via a network 135B. In an example embodiment, two or more member computing entities 200, 200' are nodes of the distributed ledger of the distributed system 100. For example, the network 135B may be an internal or private network. As shown in FIG. 1B, the system may further comprise one or more user computing entities 30, one or more external computing entities 40, one or more other and/or external networks 135A, and/or the like. For example, the other and/or external network 135A may be external, public, and/or a different network from the internal and/or private network 135B. For example, the external network 135A may be the Internet. Each of the components of the system may be in electronic communication with, for example, one another over the same or different wireless or wired networks 135, 135A, 135B including, for example, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Member Computing Entity

Figure 2:
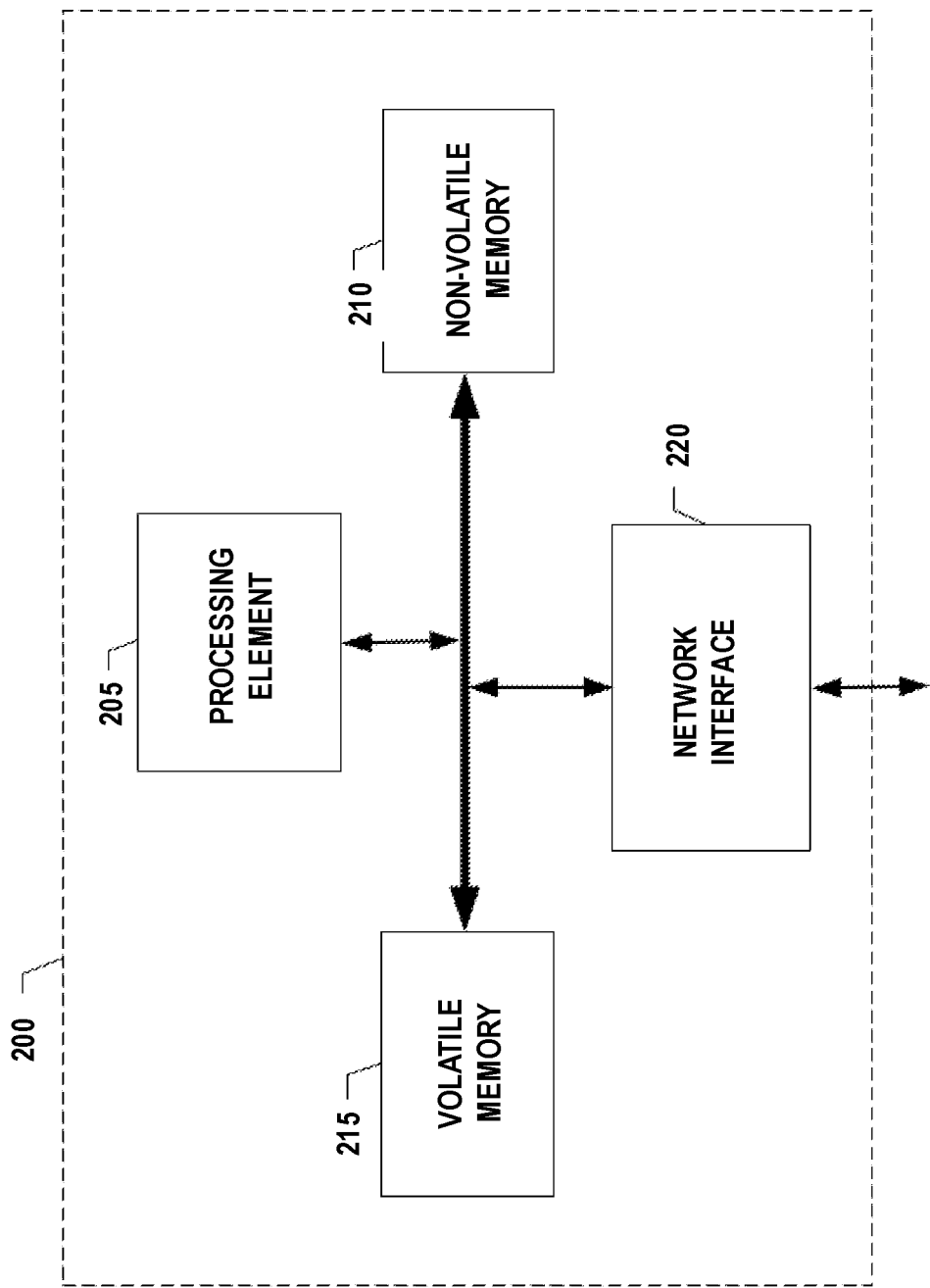
FIG. 2 is a schematic of a node computing entity in accordance with certain embodiments of the present invention.

FIG. 2 provides a schematic of a member computing entity 200 (e.g., 200A, 200B, 200C) according to one embodiment of the present invention. In general, the terms member computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In various embodiments, a member computing entity 200 is operated by and/or on behalf of an entity, individual, organization, department of a corporation, and/or the like that is a member of the distributed system 100. In an example embodiment, some or all of the member computing entities 200 are nodes of the distributed ledger of the distributed system 100. For example, a node of a distributed ledger may store a copy of the distributed ledger, participate in consensus functions for the distributed ledger, supply instances of information/data to the distributed ledger, validate instance of information/data for the distributed ledger, access instances of information/data from the distributed ledger, participate in a secondary market of the distributed ledger to exchange one or more tokens of the distributed ledger for various other value containers. For example, the secondary market may allow the member to exchange tokens of the distributed ledger for tokens of a different distributed ledger, a fiat or commodity currency, and/or the like.

As indicated, in one embodiment, the member computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the member computing entity 200 may communicate with other member computing entities 200, 200', one or more user computing entities 30, and/or the like.

As shown in FIG. 2, in one embodiment, the member computing entity 200 may include or be in communication with one or more processing elements 205 (also referred to as processors, processing circuitry, and/or similar terms used herein interchangeably) that communicate with other elements within the member computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In embodiment, the member computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the member computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the member computing entity 200 with the assistance of the processing element 205 and operating system.

As indicated, in one embodiment, the member computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the member computing entity 200 may communicate with computing entities or communication interfaces of other member computing entities 200, 200', and/or the like.

As indicated, in one embodiment, the member computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the member computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the member computing entity's 200 components may be located remotely from other member computing entity 200 components, such as in a distributed system. Furthermore, one or more of the components may be combined and additional components performing functions described herein may be included in the member computing entity 200. Thus, the member computing entity 200 can be adapted to accommodate a variety of needs and circumstances.

In example embodiments, the member computing entity 200 may be in communication with one or more other member computing entities 200, 200', one or more external computing entities 40, and/or one or more user computing entities 30. In example embodiments, the member computing entity 200 may be in communication with one or more other member computing entities 200, 200' configured for submitting instances of information/data; validating instances of information/data; accessing and/or providing access to instances of information/data; managing time dependent values of data assets within the distributed ledger (e.g., instances of information/data), tokens, and/or data access costs; performing consensus processing; storing a copy of a distributed ledger; and/or the like. In an example embodiment, the distributed ledger is a blockchain.

b. Another Exemplary Member Computing Entity

Figure 3:
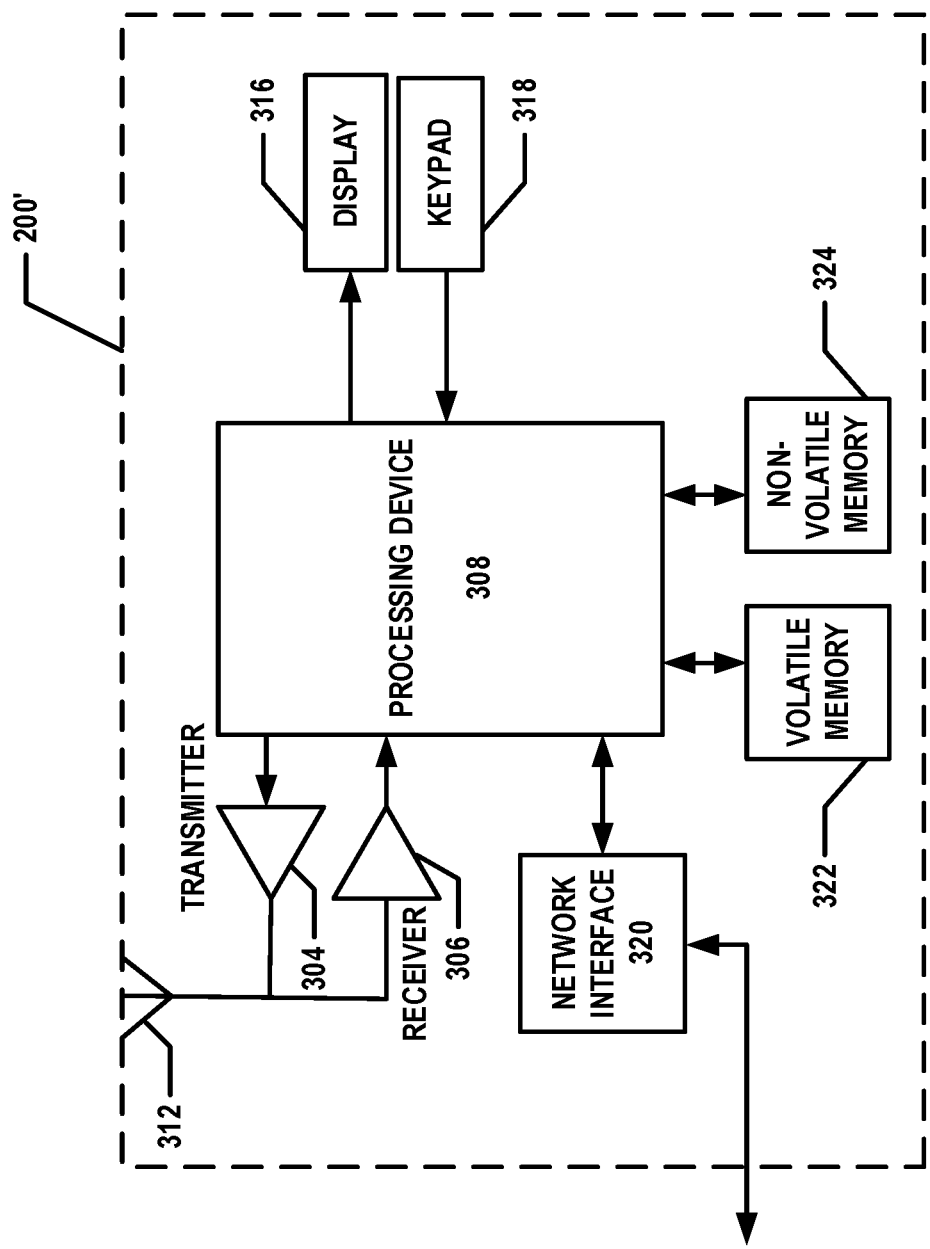
FIG. 3 is a schematic of another node computing entity in accordance with certain embodiments of the present invention.

FIG. 3 provides an illustrative schematic representative of another member computing entity 200' that can be used in conjunction with embodiments of the present invention. As shown in FIG. 3, a member computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another member computing entity 200, 200', one or more user computing entities 30, and/or the like. In this regard, the member computing entity 200' may be capable of operating with one or more air interface standards, communication protocols, modulation types, and access types. More particularly, the member computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the member computing entity 200' can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The member computing entity 200' can also download changes, add-ons, and updates, for instance, to its firmware, software (e.g., including executable instructions, applications, program modules), and operating system.

According to one embodiment, the member computing entity 200' may include location determining aspects, devices, modules, functionalities, and/or similar words used herein interchangeably. For example, the member computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the member computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The member computing entity 200' may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the member computing entity 200' to cause display or audible presentation of information/data and for user interaction therewith via one or more user input interfaces. The user input interface can comprise any of a number of devices allowing the member computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the member computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the member computing entity 200' can collect information/data, user interaction/input, and/or the like.

The member computing entity 200' can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the member computing entity 200'.

In example embodiments, the member computing entity 200' may be in communication with one or more other member computing entities 200, 200', one or more external computing entities 40, and/or one or more user computing entities 30. In example embodiments, the member computing entity 200' may be in communication with one or more other member computing entities 200, 200' configured for submitting instances of information/data; validating instances of information/data; accessing and/or providing access to instances of information/data; managing time dependent values of data assets within the distributed ledger (e.g., instances of information/data), tokens, and/or data access costs; performing consensus processing; storing a copy of a distributed ledger; and/or the like. In an example embodiment, the distributed ledger is a blockchain.

c. Exemplary User Computing Entity

In an example embodiment, a user computing entity 30 may be a computing entity configured for user interaction (e.g., via one or more user interface devices thereof) for generating, providing, validating, accessing, and/or the like one or more instances of information/data from the distributed ledger. In various embodiments, a user may be a person interacting with a user computing entity 30 (e.g., via the user interface devices thereof) or a machine user (e.g., an application, service, and/or the like operating on the user computing entity 30). In various embodiments, the user computing entity 30 may be a computing entity external to the distributed ledger (e.g., the user computing entity 30 is not a node of the distributed ledger). For example, a user computing entity 30 may generate and/or validate an instance of information/data based on information/data gathered and/or requested and received from an external computing entity 40.

In an example embodiment, a user computing entity 30 may be in communication with one or more node computing entities 200, 200' and/or one or more external computing entities 40 via one or more wired or wireless networks 135. In one embodiment, the user computing entity 30 may include one or more components that are functionally similar to those of a node computing entity 200, 200'. For example, in one embodiment, a user computing entity 30 may include: (1) a processing element that communicates with other elements via a system interface or bus; (2) one or more user interface devices (e.g., display, touchscreen display, hard or soft keyboard, mouse, and/or the like); (3) transitory and non-transitory memory; and (4) a network and/or communications interface configured to communicate via one or more wired or wireless networks 135. For example, the user computing entity 30 may receive user input (e.g., via the user input interface thereof) and provide (e.g. transmit) an indication of the user input to one or more node computing entities 200, 200' (e.g., via the network and/or communications interface).

d. Exemplary External Computing Entity

In an example embodiment, an external computing entity 40 may be a computing entity operated by and/or on behalf of an entity that is not a member of the distributed ledger. For example, an external computing entity 40 may be operated by and/or on behalf of a government entity and/or organization and configured to store and/or provide access to public government records (e.g., death certificates, rules and regulations, police reports, tax records, and/or the like). In an example embodiment, the external computing entity 40 may be a weather service computing device storing and/or providing current and/or historical weather information/data, a healthcare provider system, a computing system operated by and/or on behalf of an individual, organization, department of a corporation, and/or the like that may store and/or provide information/data that may be used to generated and/or validate an instance of information/data for the distributed ledger. For example, an external computing entity 40 may be a computing device hosting a website for an entity, and/or the like.

In an example embodiment, an external computing entity 40 may be in communication with one or more node computing entities 200, 200' and/or one or more external computing entities 40 via one or more wired or wireless networks 135. In one embodiment, the external computing entity 40 may include one or more components that are functionally similar to those of a node computing entity 200, 200'. For example, in one embodiment, an external computing entity 40 may include: (1) a processing element that communicates with other elements via a system interface or bus; (2) one or more user interface devices (e.g., display, touchscreen display, hard or soft keyboard, mouse, and/or the like); (3) transitory and non-transitory memory; and (4) a network and/or communications interface configured to communicate via one or more wired or wireless networks 135. For example, the external computing entity 40 may receive user input (e.g., via the user input interface thereof) and provide (e.g. transmit) an indication of the user input to one or more node computing entities 200, 200' (e.g., via the network and/or communications interface).

e. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. Exemplary System Operation

In various embodiments, a distributed ledger has a plurality of members. Each member may be an entity such as an individual, organization, department of a corporation, family, group, and/or the like. An entity may become a member of the distributed ledger by generating a member profile and/or account. For example, an entity may become a member of the distributed ledger by participating in a registration process during which a member profile and/or account corresponding to the member is generated. In various embodiments, a member profile and/or account may comprise member contact information/data (e.g., a telephone number, mailing address, street address, electronic mail address, fax number, and/or the like that may be used to contact the member and/or an agent thereof); a reputation indicator configured to represent the reputation of the member within the distributed system 100 of the distributed ledger; account information/data identifying one or more fiat and/or commodity currency based accounts of the member; a token wallet for storing information/data regarding one or more tokens of the distributed ledger that are attributed to the member; and/or the like. In various embodiments, a member may interact with the distributed ledger via a member computing entity 200. The distributed system 100 comprises a plurality of member computing entities 200 that are nodes of the distributed ledger. For example a node of the distributed ledger stores a local copy of the distributed ledger and may be configured to execute application and/or program code configured to perform a consensus process of the distributed ledger and/or perform other functions of the distributed ledger. In various scenarios, a member computing entity 200 may be a supplying member computing entity 200A that submits one or more instances of information/data, a validating member computing entity 200B that validates one or more submitted instances of information/data, and/or a consuming member computing entity 200C that access one or more instances of information/data.

In various embodiments, a supplying member may submit an instance of information/data to the distributed ledger via a supplying member computing entity 200A. One or more validating members may validate the instance of information/data via corresponding validating member computing entities 200B. When the assurance level (e.g., a confidence level regarding the accuracy of the details provided by the instance of information/data) reaches a threshold assurance level, the instance of information/data is made available via the distributed ledger for access by one or more consuming members via corresponding consuming member computing entities 200C. In an example embodiment, a supplying member and/or validating member may be provided a reward and/or compensated for supplying and/or validating the instance of information/data with a token within the distributed ledger that is attributed a token value that is determined based on the value of the instance of information/data. In an example embodiment, the token value is also determined based on a sharing plan regarding how the value of the instance of information/data is shared between the supplying member and the one or more validating members. When the consuming member requests to access the instance of information/data a data access cost is determined based on the current value of the instance of information/data. The consuming member exchanges one or more tokens amounting to at least the data access cost in exchange for accessing the instance of information/data. The value of the data access cost may then be attributed to tokens provided to the supplying member and/or validating member(s) corresponding to the instance of information/data. Once the value of the data access cost is attributed to the tokens provided and/or attributed to the supplying member and/or validating member(s), the tokens provided and/or attributed to the supplying member and/or validating member(s) have a realized and/or redeemable value. In an example embodiment, the value of an instance of information/data, token value, and/or data access cost is time dependent.

Various embodiments provide a distributed ledger having tokens that are attributed with a time dependent value and corresponding methods, systems, apparatuses, and/or computer program products. In particular, the distributed ledger may receive, store, and/or provide for access instances of information/data that have details that are expected to change within a particular time period, have the possibility of changing within a particular time period, require re-validation after a particular time period (e.g., as dictated by relevant rules and regulations), and/or the like. As such the value of an instance of information/data may be time dependent. In various embodiments, the time dependency of an instance of information/data depends on the remaining lifetime (or TTL) of the instance of information/data and/or a depreciation policy/protocol of the distributed ledger. In an example embodiment, the value of an instance of information/data reflects the usefulness of the instance of information/data to a member. In an example embodiment, the remaining lifetime (or TTL) of an instance of information/data is the amount of time left before the end of the particular time period. The depreciation policy/protocol is a policy/protocol defining the reduction of value of an instance of information/data that is defined on and/or for the distributed ledger. For example, the depreciation policy/protocol may define time gradient of depreciation of the value of an instance of information/data for the distributed ledger. In an example embodiment, the distributed ledger may define a plurality of depreciation policies that each correspond to a particular type of instance of information/data. For example, the distribution ledger may store instances of information/data of type "provider contact information" and instances of information/data of type "provider specialty." The time dependency of these two types of instances of information/data may be governed and/or determined based on different depreciation policies within the distributed ledger. For example, the instances of information/data of type "provider contact information" may have a time gradient of depreciation that is linear with respect to time and instance of information/data of type "provider specialty" may have a time gradient of depreciation that is constant with respect to time, in an example embodiment.

a. Time Dependent Value of an Instance of Information/Data

In various embodiments, the time dependent value of an instance of information/data i $V_i(t)$ is a function $f$ of various characteristics of the instance of information/data i. In an example embodiment, the time dependent value of an instance of information/data i is determined as $V_i(t)=f(Q_i, S_i, R_s, A_i, L_i(t), P(t))$ where $Q_i$ is a quality measure of the instance of information/data i, $S_i$ is the timeliness with which the instance of information/data i was submitted to the distributed ledger, $R_s$ is the reputation of the supplying member s that submitted the instance of information/data or may be a function of the reputation of the supplying member s that submitted the instance of information/data and the validating member(s) that validated the instance of information/data, $A_i$ is the assurance level of the instance of information/data i, $L_i(t)$ is the remaining lifetime (or TTL) of the instance of information/data i and is a function of time, and $P(t)$ is the depreciation policy/protocol of the distributed ledger (relevant to a type corresponding to the type of the instance of information/data i) and is a function of time.

In an example embodiment, the quality measure of the instance of information/data $Q_i$ is determined by an automated quality assurance application, program, and/or the like that is based on and/or tailored to the particular type of the instance of information/data. For example, the quality assurance application, program, and/or the like may check whether the instance of information/data comprises one or more fields expected to be present in an instance of information/data of the particular type, whether the value of one or more fields of the instance of information/data are appropriate for the field (e.g., a phone number field comprises ten digits, a temperature within an appropriate range, and/or the like), that two or more fields of the instance of information/data are consistent (e.g., a street address is consistent with the zip code), and/or the like.

The timeliness $S_i$ of instance of information/data i refers to how quickly the instance of information/data was submitted to the distributed ledger (e.g., by the supplying member computing entity 200A). For example, the contact information/data corresponding to a service provider changed on Oct. 1, 2018. An instance of information/data providing the new service provider contact information/data submitted to the distributed ledger on Oct. 15, 2018 is more timely (e.g., has increased timeliness) than an instance of information/data providing the new service provider contact information/data submitted to the distributed ledger on Dec. 1, 2018.

The reputation $R_s$ of a supplying member is determined based on previous submissions provided by and/or validations performed by the supplying member s that supplied the instance of information/data i and/or the validating member(s) that validated the instance of information/data i. In an example embodiment, a member's reputation may be improved (e.g., reputation value increases) when the member submits instances of information/data that are validated, a member validates instances of information/data that are also validated by other validating members, and/or the like. In an example embodiment, a member's reputation is decreased (e.g., reputation value decreases) when one or more consuming members report issues and/or problems with instances of information/data supplied by and/or validated by the member and/or multiple validating members indicate that an instance of information/data supplied by the member is not validatable (e.g., contains one or more incorrect details).

The assurance level $A_i$ of the instance of information/data i is based on the number of times the instance of information/data has been independently verified by validating members. For example, in an example embodiment, if two validating members have validated an instance of information/data (and no validating members have indicated that the instance of information/data is not validatable) the instance of information/data may have an assurance level A of two. In an example embodiment, a validating member may score the validity and/or level to which the validating member has verified an instance of information/data and the assurance level for the instance of information/data may be determined based on the score of provided by the validating member. In an example embodiment, the assurance level of an instance of information/data may take into account the reputation of the validating member(s) that have validated the instance of information/data. Generally, the assurance level provides an indication of how confident a consuming member can be that the details of the instance of information/data are correct and valid.

As described above, the remaining lifetime (or TTL) of an instance of information/data is the amount of time left before the end of a particular time period, wherein the details of instances of information/data may be expected to change within the particular time period, have the possibility of changing within the particular time period, require re-validation after the particular time period (e.g., as dictated by relevant rules and regulations), and/or the like. For example, the remaining lifetime (or TTL) is the amount of time left for which the instance of information/data is useful.

As noted above, the deprecation policy/protocol P is a policy/protocol defining the reduction of value over time of an instance of information/data that is defined on and/or for the distributed ledger. For example, the depreciation policy/protocol may be a schedule to decrease the value of an instance of information/data. For example, the depreciation policy/protocol may define time gradient of depreciation of the value of an instance of information/data for the distributed ledger. In an example embodiment, the distributed ledger may define a plurality of depreciation policies that each correspond to a particular type of instance of information/data. In various embodiments, the depreciation policy/protocol may be adjusted and/or modified from time to time (e.g., by one or more administrators and/or members of the distributed ledger) to control the total value of live tokens within the economy of the distributed ledger and/or distributed system 100. For example, the depreciation policy/protocol may be adjusted and/or modified to control the number of tokens to a manageable, predetermined, and/or configurable number within the distributed ledger and/or distributed system 100 (e.g., for technical reasons such as not overwhelming the system with a large number of live tokens or causing a high level of inflation of token value). In an example embodiment, the depreciation policy/protocol may be adjusted and/or modified to maintain a level of correlation between the value of instances of information/data and a reference fiat (or commodity) currency. For example, alternative sources (e.g., outside of the distributed ledger) may provide the same instance of information/data and/or instances of information/data of the same type at a data access cost of $2 per instance and the number or initial value of the tokens corresponding to the same instance of information/data or instances of information/data of the same type may be adjusted and/or modified to maintain a stable exchange rate between the value of instances of information/data within the distributed ledger and the reference fiat (or commodity) currency. In an example embodiment, the policy/protocol for depreciation may be adjusted and/or modified to enforce other economic policies, participant behavior, and/or the like.

Figure 4:
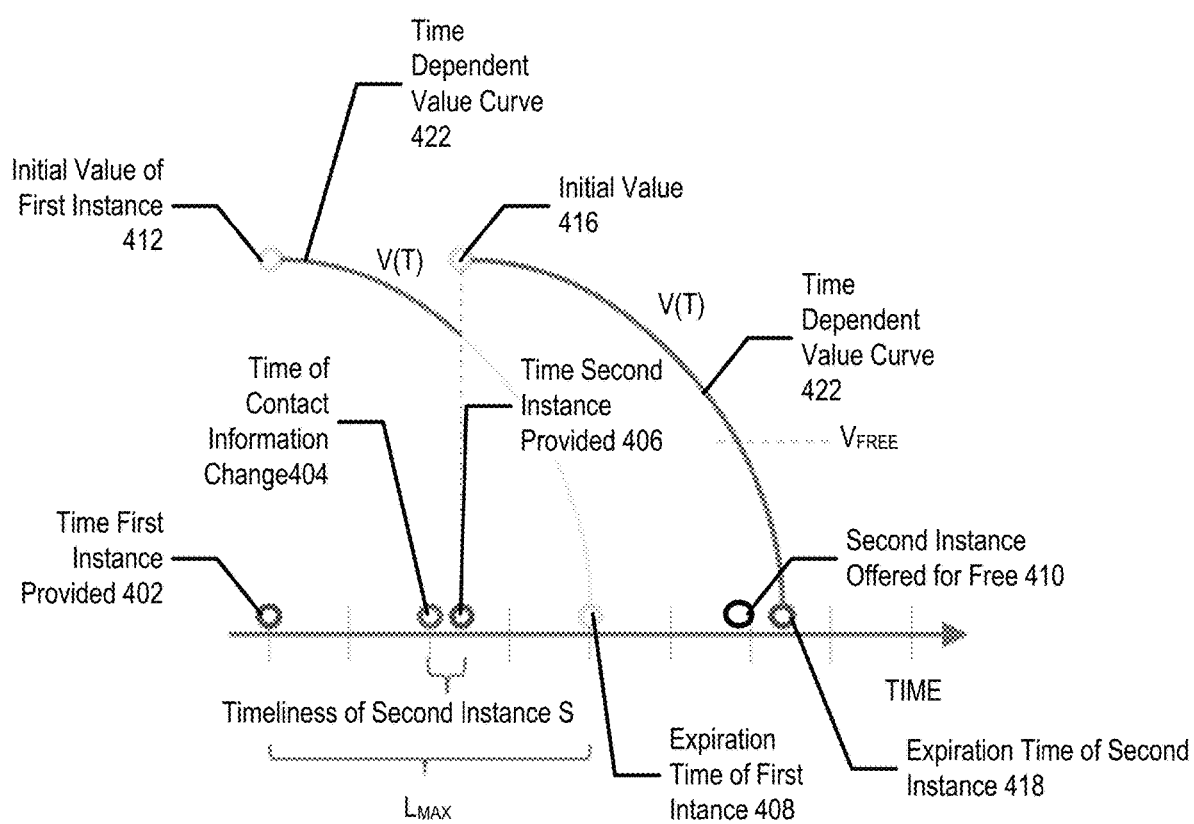
FIG. 4 illustrates an example of a time dependent value of an instance of information/data, in accordance with an example embodiment of the present invention.

FIG. 4 illustrates an example of a time dependent value V(t) of an instance of information/data, in accordance with an example embodiment of the present invention. The curves 422 show how the time dependent value V(t) changes with time, according to an example embodiment. At time 402, a first instance of information/data is provided to the distributed ledger and is assigned and/or attributed an initial value of 412. For the sake of illustration, the first instance of information/data provides contact information/data for Provider A. The lifetime of the first instance of information/data expires at time 408. At time 404, one or more elements of the contact information/data for Provider A change. A second instance of information/data corresponding to the contact information/data of Provider A is submitted at time 406. The time between time 404, when the one or more elements of the contact information/data for Provider A change, and time 406, when the second instance of information/data are submitted to the distributed ledger, corresponds to the timeliness S of the second instance of information/data. The second instance of information/data is assigned and/or attributed an initial value of 416 and the second instance of information/data supersedes the first instance of information/data. The lifetime of the second instance of information/data expires at time 418 at which time the value of the second instance of information/data reaches zero. In an example embodiment, the time between time 406 (the time when the second instance of information/data is submitted) and time 418 (when the lifetime of the second instance of information/data expires) is a predetermined/configurable maximum lifetime $L_{max}$ of an instance of information/data. In an example embodiment, the predetermined/configurable maximum lifetime $L_{max}$ is the particular time period and/or determined based on the particular time period. In various embodiments, a free use criteria (e.g., a freely available value $V_{free}$) is defined for the distributed ledger and/or a type of instance of information/data available via the distributed ledger. In an example embodiment, once the value V(t) for the instance of information/data reaches the freely available value $V_{free}$, at time 410, the data access cost for the instance of information/data is set to zero and the instance of information/data is available for no cost (e.g., free) to members of the distributed ledger. In various embodiments, the free use criteria may take into account the quality, assurance level, remaining lifetime (or TTL), and/or the like of the instance of information/data. For example, the instance of information/data may be provided to free (e.g., at a data access cost of zero) if the quality or assurance level of the instance of information/data is below a corresponding threshold level, if the remaining lifetime (or TTL) is less than a threshold remaining lifetime, and/or the like, in accordance with the free use criteria.

b. Making an Instance of Information/Data Available Via a Distributed Ledger FIG. 5 provides a flowchart illustrating processes, procedures, operations, and/or the like for making an instance of information/data available via the distributed ledger, in accordance with an example embodiment of the present invention. Starting at step/operation 502, a submitted instance of information/data is received. For example, a member computing entity 200 may receive a submitted instance of information/data. For example, a supplying member computing entity 200A may generate an instance of information/data, for example, based on an interaction, data exchange, and/or communication with an external computing entity 40. In an example embodiment, a user (e.g., a human user and/or a machine user) may operate a user computing entity to cause the generation of an instance of information/data, for example, based on an interaction, data exchange, and/or communication with an external computing entity 40, and cause the instance of information/data to be provided to a supplying member computing entity 200A corresponding to the user. In various embodiments, the instance of information/data is associated with a type. The type corresponds to and/or determines one or more fields and/or appropriate values for one or more fields that are required to be and/or optionally can be part of the instance of information/data.

The supplying member computing entity 200A submits the instance of information/data to the distributed ledger for inclusion of the submitted instance of information/data in the distributed ledger. For example, a member computing entity 200 (which may be a supplying, validating, consuming, and/or other member computing entity 200A, 200B, 200C in various scenarios) receives the submitted instance of information/data. For example, the user computing entity 30 and/or supplying member computing entity 200A may provide and/or submit (e.g., transmit via network interface 220, 320) the submitted instance of information/data via one or more networks 135, 135A, 135B such that a member computing entity 200 receives the submitted instance of information/data. In an example embodiment, a first application, program, and/or the like may be operating on the supplying member computing entity 200A that is configured to generate instances of information/data and a second application, program, and/or the like may operating on the supplying member computing entity 200A that is configured to interact and/or interface with the distributed ledger. The first application, program, and/or the like may generate the instance of information/data and submit the instance of information/data to the second application, program, and/or the like via processing element 205, 308. In an example embodiment, the instance of information/data is a smart contract, part of a smart contract, embedded in a smart contract, and/or the like.

In an example embodiment, the supplying member may provide a sharing plan along with the submitted instance of information/data. For example a sharing plan indicates an amount and/or percentage/fraction of the value of the submitted instance of information/data and/or value of the data access costs collected when one or more consuming members access the submitted instance of information/data. For example, the sharing plan may indicate a validation bounty which is the percentage/fraction of the realized value of the data that is to be split amongst the validating members that validate the submitted instance of information/data in a manner that contributes to the assurance level associated with the submitted instance of information/data. In an example embodiment, a validating member validates a submitted instance of information/data in a manner that contributes to the assurance level associated with the submitted instance of information/data when the validating member provides a validation of the submitted instance of information/data to the distributed ledger. In an example embodiment, the validation of the submitted instance of information/data is required to be provided within a particular time frame to affect the assurance level of the submitted instance of information/data. The supplying member may offer higher or lower validation bounties to provide incentive to validating members and/or manage token margin received by the supplying member. In an example embodiment, the distributed ledger may dictate a minimum default value for the validation bounty. In an example embodiment, a member profile and/or account corresponding to the supplying member may indicate a default sharing plan to be used if a sharing plan is not submitted alongside a submitted instance of information/data. In an example embodiment, if the member profile and/or account does not comprise a default sharing plan, the minimum default value for the validation bounty dictated by the distributed ledger is used. In an example embodiment, the sharing plan may, in addition to indicating a validation bounty, indicate a maximum number of validating members with which the supplying member is willing to share the validation bounty. For example, the sharing plan may indicate that the supplying member is only willing to share the validation bounty with the first five validating members that validate the submitted instance of information/data.

At step/operation 504, a quality assessment of the submitted instance of information/data is performed. For example, the member computing entity 200 that received the submitted instance of information/data may assess the quality of the submitted instance of information/data. For example, the quality of the submitted instance of information/data may be assessed to generate a quality measure Q for the submitted instance of information/data. In an example embodiment, the quality measure of the instance of information/data $Q_i$ is determined by an automated quality assurance application, program, and/or the like that is based on and/or tailored to the particular type of the instance of information/data. For example, the quality assurance application, program, and/or the like may check whether the instance of information/data comprises one or more fields expected to be present in an instance of information/data of the particular type, that all required fields are populated with an appropriate value, pattern defined semantics conform to the expected pattern (e.g., phone numbers, dates, and/or the like conform to expected corresponding patterns), whether the value of one or more fields of the instance of information/data are appropriate for the field (e.g., a phone number field comprises ten digits, a temperature within an appropriate range, and/or the like), that two or more fields of the instance of information/data are consistent (e.g., a street address is consistent with the zip code), cross-field consistency expectations are met, externally confirmable data (e.g., addresses) meet the expected quality level, and/or the like. In an example embodiment, the quality assessment is performed as part of a consensus process for adding the submitted instance of information/data to the distributed ledger. For example, the quality assessment may confirm that the submitted instance of information/data conforms to the structural standard of the distributed ledger. In an example embodiment, the quality assessment is performed before a consensus process for the submitted instance of information/data is initiated. For example, the consensus process for including the submitted instance of information/data may be initiated responsive to determining that the submitted instance of information/data does satisfy a predetermined/configurable quality threshold requirement (e.g., the corresponding quality measure Q is greater than or equal to a predetermined/configurable quality measure threshold). In an example embodiment, the quality measure Q is determined through the use of a smart contract. In an example embodiment, the quality measure Q is associated with the submitted instance of information/data (e.g., for use in determining the value of the submitted instance of information/data in an example embodiment).

After and/or responsive to determining that the submitted instance of information/data satisfies the predetermined/configurable quality threshold requirement and, in some embodiments, and is confirmed via the consensus process of the distributed ledger, the process continues to step/operation 506. At step/operation 506, a token for providing a reward and/or compensation value (e.g., a supplier token) is generated and attributed to the supplying member. For example, a record may be generated in the distributed ledger that records a transaction wherein the supplying member is attributed a supplier token. In an example embodiment, a supplier token may be generated and attributed to the supplying member by storing the supplier token in association with the member profile and/or account corresponding to the supplying member (e.g., within the token wallet of the member profile and/or account). For example, a member computing entity 200 (e.g., that is a node of the distributed ledger) may generate a supplier token and attribute the supplier token to the supplying member. In an example embodiment, the supplier token has no immediate redeemable value. In an example embodiment, there is no upper limit to the number of tokens allowed within the distributed ledger and/or no upper limit to the number of tokens that a member may own (e.g., tokens that have been attributed to the member). In an example embodiment, there is an upper limit to the number of tokens allowed within the distributed ledger and the supplier token is not generated and attributed to the supplying member until the number of tokens within the distributed ledger is below the upper limit. In such an example embodiment, a first come, first served system may be used for generating and attributing any backlog of tokens. In an example embodiment, there is an upper limit to the number of tokens that can be attributed to a member at any point in time. In such an example embodiment, the supplier token will be generated and attributed to the supplying member when the number of tokens currently attributed to the supplying member (and having a value) is below the upper limit.

After and/or responsive to determining that the submitted instance of information/data satisfies the predetermined/configurable quality threshold requirement and, in some embodiments, and is confirmed via the consensus process of the distributed ledger, the submitted instance of information/data is offered for validation. For example, a validation opportunity may be posted to the distributed ledger and/or may be communicated to one or more member computing entities 200 via network 135, 135B. One or more members may choose to be validating members for the submitted instance of information/data. For example, one or more member computing entities 200 may respond to the validation opportunity requesting to validate the submitted instance of information/data. For example, a validating member computing entity 200B may (e.g., via the distributed ledger) receive a submitted instance of information/data and validate the submitted instance of information/data (e.g., via communication with one or more external computing entities 40 and/or the like). In an example embodiment, a validating member computing entity 200B may (e.g., via the distributed ledger) receive a hash of the instance of information/data, an opaque quality function supplied by the supplying member (e.g., via the supplying member computing entity 200A), and/or information/data for use in another comparison and validation approach that does not reveal the details of the instance of information/data to the validator such that the validating member can validate the submitted instance of information/data (e.g., via communication with one or more external computing entities 40 and/or the like)

In an example embodiment, a human user and/or machine user of a user computing entity 30 associated with a validating member may receive the submitted instance of information/data (and/or at least a portion thereof) and validate the details of the submitted instance of information/data. The user computing entity 30 may then be operated (e.g., by the human user and/or machine user) to provide a validation response to the validating member computing entity 200B. The validating member computing entity 200B provides a validation response to the distributed ledger and/or a member computing entity 200 that is a node of the distributed ledger. In various embodiments, the validation response indicates that one or more details of the submitted instance of information/data has been validated, that the entire submitted instance of information/data has been validated, that one or more errors have been found in the submitted instance of information/data, and/or the like.

At step/operation 508, one or more validation responses that validate the submitted instance of information/data (e.g., confirm one or more details of the submitted instance of information/data) are received. For example, one or more validating member computing entities 200B may provide validation responses to the distributed ledger and/or to a member computing entity 200 that is a node of the distributed ledger that validate the submitted instance of information/data. When a validation response is received regarding the submitted instance of information/data, the assurance level associated with the instance of information/data is updated. The assurance level $A_i$ of the instance of information/data i is based on the number of times the instance of information/data has been independently verified by validating members. For example, in an example embodiment, if two validating members have validated an instance of information/data (and no validating members have indicated that the instance of information/data is not validatable) the instance of information/data may have an assurance level A of two. In an example embodiment, a validating member may score the validity and/or level to which the validating member has verified an instance of information/data and the assurance level for the instance of information/data may be determined based on the score of provided by the validating member. In an example embodiment, the assurance level of an instance of information/data may take into account the reputation of the validating member(s) that have validated the instance of information/data. Generally, the assurance level provides an indication of how confident a consuming member can be that the details of the instance of information/data are correct and valid.

In an example embodiment, if two different supplying members submit similar instances of information/data (e.g., both correspond to the contact information for Provider A) that have matching details (e.g., the same phone number, same address, same email, and/or the like) the two instances of information/data may be taken as validating each other. For example, a first instance of information/data received at a similar time as a similar second instance of information/data may validate the second instance of information/data if the details of the two instances of information/data are in agreement, and vice-versa. In various embodiments, two instances of information/data are received at a similar time if the assurance level associated with the earlier submitted instance of information/data has not yet satisfied the quality assurance threshold requirement.

In an example embodiment, the assurance level may be set at zero, such that the process may flow from block 506 to block 512. For example, one or more validating members may validate the submitted instance of information/data. However, the quality assurance threshold requirement is automatically met once the submitted instance of information/data passes the quality assessment at block 504.

At step/operation 510, it is determined if the assurance level satisfies a quality assurance threshold requirement (e.g., has an assurance level that exceeds or that is greater than or equal to a quality assurance threshold). If it is determined that the assurance level does not satisfy the quality assurance threshold requirement, the process returns to step/operation 508 to await additional validations of the submitted instance of information/data. In an example embodiment, if the assurance level does not satisfy the quality assurance threshold requirement, the supplier token may be attributed a value that is a fraction of the time dependent value of the instance of information/data. For example, the value of the supplier token is configured to reflect the time-dependent value of the corresponding instance of information/data. If the assurance level does not satisfy the quality assurance threshold requirement, then the realized value of the corresponding instance of information/data may be a fraction of the potential value of the corresponding instance of information/data, in an example embodiment. For example, if the quality assurance threshold requirement requires that two validating members validate the instance of information/data and only one validating member has validated the instance of information/data, the supplier token may be attributed with a value that is half of the time dependent value of the instance of information/data. In an example embodiment, the quality assurance threshold requirement may be determined based on anticipated and/or historical demand for information/data similar to and/or corresponding to the submitted instance of information/data. For example, instances of information/data that are expected to have a higher demand may have a higher and/or more stringent quality assurance threshold requirement than instances of information/data that are expected to have a very small demand, in an example embodiment. In an example embodiment, the value attributed to the supplier token is not redeemable until a consuming member has accessed the instance of information/data via the distributed ledger.

If it is determined that the assurance level does satisfy the quality assurance threshold requirement, the submitted instance of information/data becomes a validated instance of information/data. The validated instance of information/data is made available for access by one or more consuming members of the distributed ledger at step/operation 512. For example, the validated instance of information/data may be added to the distribution ledger such that one or more consuming members of the distributed ledger may access the validated instance of information/data. In an example embodiment, one or more applications and/or programs configured for offering member computing entities access to instances of information/data stored in the distributed ledger may allow access to the validated instance of information/data responsive to the validated instance of information/data satisfying the quality assurance threshold requirement. In an example embodiment, the assurance level of a validated instance of information/data is fixed and further validations of the validated instance of information/data do not affect the assurance level thereof. In an example embodiment, the assurance level of a validated instance of information/data may be modified in response to one or more validation responses regarding the validated instance of information/data being received by the distributed ledger and/or a member computing entity 200. In an example embodiment, the validation of an instance of information/data is part of the consensus process for the distributed ledger and the validated instance of information/data is added to the distributed ledger responsive to the validated instance of information/data satisfying the quality assurance threshold requirement.

In an example embodiment, it may be determined if the lifetime of the submitted instance of information/data has expired by the time the assurance level associated with the submitted instance of information/data satisfies the quality assurance threshold requirement. If it is determined that the lifetime of the submitted instance of information/data has expired by the time the assurance level associated with the submitted instance of information/data satisfies the quality assurance threshold requirement, the process for the submitted instance of information/data may stop and the submitted instance of information/data may not be made available via the distributed ledger, in an example embodiment. If it is determined that the lifetime of the submitted instance of information/data has not expired by the time the assurance level associated with the submitted instance of information/data satisfies the quality assurance threshold requirement, the submitted instance of information/data is deemed a validated instance of information/data and the process may continue such that the validated instance of information/data is made available via the distributed ledger, in an example embodiment.

In various embodiments, making an instance of information/data available via the distributed ledger comprising posting the instance of information/data to the distributed ledger, posting a hash or other representation (e.g., including meta data corresponding to the instance of information/data such as an entity corresponding to the instance of information/data; a quality measure, assurance level, timeliness, lifetime, expiration date, and/or the like corresponding to the instance of information/data; and/or the like) of the instance of information/data to the distributed ledger, posting information/data corresponding to the supplier token generated and attributed to the supplying member corresponding to the submitted instance of information/data, and/or the like.

At step/operation 514, a value is attributed to the supplier token that was attributed to the supplying member. For example, a member computing entity 200 may attribute a value to the supplier token that was attributed to the supplying member at step/operation 506. For example, the value may be attributed to the supplier token as a reward provided to the supplying member for submitting the now validated instance of information/data. For example, a value may be attributed to the supplier token corresponding to the instance of information/data and that is attributed to and/or owned by the supplying member (e.g., stored in the distributed ledger in association with the supplying member, stored in the supplying member's token wallet, and/or the like). For example, the value of the supplier token is configured to reflect the time-dependent value of the corresponding instance of information/data. For example, the value attributed to the supplier token may be the value of the corresponding instance of information/data at the time the value is attributed to the supplier token and/or a portion/fraction of the value of the corresponding instance of information/data at the time the value is attributed to the supplier token. In an example embodiment, the portion/fraction is determined based on the sharing plan. In various embodiments, a value is attributed to the supplier token responsive to the validated instance of information/data being made available for access via the distributed ledger. In an example embodiment, the attributed value is not redeemable until a consuming member accesses the validated instance of information/data. For example, if the validated instance of information/data submitted by the supplying member is not accessed by a consuming member within the lifetime of the instance of information/data (e.g., before the instance of information/data is superseded or before the value of the instance of the information/data reaches a freely available value $V_{free}$), the supplying member (and the validating members) may not receive a reward for the supplying (and validating) of the instance of information/data. Thus, supplying members are encouraged to submit useful instances of information/data that are likely to be accessed by consuming members and to reduce the submission of instances of information/data that are unlikely to be of use to the community and merely cause the use of extra computer storage space by the distributed ledger.

In an example embodiment, the value attributed to the supplier token is equal to the value of the validated instance of information/data at the time the validated instance of information/data was submitted, at the time the validated instance of information/data was made available for access via the distributed ledger, at the time the validated instance of information/data was accessed by a consuming member, and/or the like. In an example embodiment, the value attributed to the supplier token is determined based on (a) the value of the validated instance of information/data at the time the validated instance of information/data was submitted, at the time the validated instance of information/data was made available for access via the distributed ledger, at the time the validated instance of information/data was accessed by a consuming member, and/or the like and (b) the sharing plan (e.g., the validation bounty). In an example embodiment, the value attributed to the supplier token may be a step function that maintains the attributed value for a predefined period of time. In an example embodiment, the predefined period of time ends when the lifetime of the validated instance of information/data expires. In an example embodiment, the predefined period of time may be shorter or longer than the lifetime of the validated instance of information/data. In an example embodiment, the value attributed to the supplier token may track the value of the validated instance of information/data. For example, the value attributed to the supplier token may decrease as the remaining lifetime (or TTL) of the validated instance of information/data decreases and/or may decrease in accordance with a depreciation policy/protocol of the distributed ledger. For example, the value attributed to the supplier token may decrease linearly as the remaining lifetime (or TTL) of the validated instance of information/data decreases. In another example, the value attributed to the supplier token may decrease in a quadratic manner with respect to the remaining lifetime (or TTL) of the validated instance of information/data, based on the depreciation policy/protocol of the distributed ledger. In an example embodiment, the depreciation policy/protocol may be updated and/or modified for instances of information/data in general, for instances of information/data of a particular type, and/or for a particular instance of information/data in response to and/or based on data contribution rates, data consumption and/or access rates, a current number and threshold number of tokens allowed within the distributed ledger, and/or the like. For example, the lifetime and/or depreciation policy/protocol corresponding to the value of the validated instance of information/data may be updated and/or modified to control the number of valid tokens within the distributed ledger, to control volatility of token value with respect to a fiat (and/or commodity) currency, and/or the like. In an example embodiment, the lifetime of the value of the supplier token (e.g., the time when the value attributed to the token is greater than zero) may be adjusted. In an example embodiment, the lifetime of the value of the supplier token is preset and the rate at which the value decreases may be adjusted without adjusting the lifetime of the value. In various embodiments, the supplier token may be configured to expire (e.g., no longer be a valid token) when the value attributed to the token reaches zero. For example, the time dependency of the value of the supplier token may encourage members to exchange tokens for access to information/data stored in the distributed ledger rather than stockpiling tokens and/or token value.

In various embodiments, the supplying member may use the (redeemable) value of the supplier token to access instances of information/data available via the distributed ledger, may trade the supplier token via a secondary market associated with the distributed ledger, and/or the like. In various embodiments, one or more validator tokens may be generated and attributed to the validating members that provided validation responses for the validated instance of information/data. In an example embodiment, each validator token may be attributed a value based on the value of the supplier token attributed to the supplying member, the value of the validated instance of information/data when the validated instance of information/data was submitted, the value of the validated instance of information/data when the validated instance of information/data was validated by the corresponding validated member, the value of the validated instance of information/data when the validated instance of information/data is made available for access via the distributed ledger, the value of the validated instance of information/data when the validated instance of information/data is accessed by a consuming member, and/or the like. In various embodiments, each validator token may be attributed a value determined based on the sharing plan (e.g., the validation bounty). In an example embodiment, validator tokens are generated and attributed to the validating members responsive to the validated instance of information/data being made available for access via the distributed ledger. In an example embodiment, a value may be attributed to the validator tokens responsive to the validated instance of information/data being made available for access via the distributed ledger. However, the value of the validator token is not redeemable until after a consuming member accesses the validated instance of information/data, in an example embodiment. In an example embodiment, a value may be attributed to the validator tokens responsive to the validated instance of information/data being accessed by one or more consuming members (e.g., redeemable value may be added to a validator token each time the validated instance of information/data is accessed by a consuming member). In an example embodiment, validator tokens are generated, attributed to the validating members, and attributed a redeemable value responsive to the validated instance of information/data being access by a consuming member (and/or each time the validated instance of information/data is accessed by a consuming member). In an example embodiment, no value is attributed to the validator tokens until the validated instance of information/data is accessed by a consuming member. For example, this may encourage validating members to validate multiple submitted instances of information/data. In an example embodiment, a token (e.g., validator token, supplier token, and/or other token associated with the distributed ledger) may be a smart contract. In an example embodiment, a token may comprise a smart contract. In various embodiments, a smart contract is a computer protocol, computer program, application, and/or the like, configured to digitally facilitate, verify, and/or enforce negotiation and/or performance of a contract. For example, a smart contract associated with a token may be configured to determine the value associated with the token at a particular point in time based on, for example, the original value attributed to the token (e.g., the initial value), the remaining lifetime (or TTL) of a corresponding validated instance of information/data, a depreciation policy/protocol of the distributed ledger corresponding to the validated instance of information/data, and/or the like. In an example embodiment, value is attributed to the token and/or made redeemable by posting a smart contract to the distributed ledger and/or the like. In an example embodiment, a token is programmable such that the initial value of the token and/or any redeemable value of the token may be self-determined (e.g., determined by the token itself) based on initial value of the token, the time dependency of the value of the token, and/or the like. In an example embodiment, the token includes information/data but does not include any logic (e.g., computer-executable instructions) and the initial value and/or any redeemable value of the token at a particular point in time may be determined by an oracle based on the information/data of the token.

FIG. 6 illustrates a plot 600 of the values of three supplier tokens attributed and/or owned by a supplying member of the distributed ledger over a thirty day period. Each of the three supplier tokens corresponds to an instance of information/data submitted by the supplying member. The depreciation policy/protocol for the illustrated supplier tokens is a linear decay with time and the supplying member does not exchange any of the three illustrated tokens during this time period. The plot 600 shows the attributed, redeemable value of each of the supplier tokens. The illustrated units of value are arbitrary and are intended to show value relative to other tokens within the distributed ledger.

c. Accessing an Instance of Information/Data Available Via a Distributed Ledger

FIG. 7 provides a flowchart illustrating processes, procedures, operations, and/or the like for providing access to an instance of information/data via the distributed ledger, in accordance with an example embodiment of the present invention. For example, a human user and/or a machine user may operate a user computing entity 30 that is in communication with a consuming member computing entity 200C and/or a machine user may operate a consuming member computing entity 200C to access an application, interactive user interface, program, and/or the like that allows a user (e.g., human user and/or machine user) to search, browse, and/or the like for various instances of information/data. For example, the application, interactive user interface, program, and/or the like may allow the user to browse through a plurality of instances of information/data that may be organized in a flat or hierarchical manner. For example, the application, interactive user interface, program, and/or the like may allow the user to provide one or more search terms for identifying an instance of information/data of interest. For example, a user may browse through a collection of instances of information/data that are organized in a hierarchical way based on types of service providers as one level, location of service providers as another level, and service provider name as yet another level to access instances of information/data corresponding to Provider A. In another example embodiment, a user may enter the search term "Provider A" into a search field provided by the application, interactive user interface, program, and/or the like and be provided with an indication of the instances of information/data associated with Provider A.

In an example embodiment, the user (e.g., human or machine user) may indicate a desired minimum assurance level and/or quality measure of instances of information/data they are interested in accessing. For example, a user may indicate as part of a search query, in profile information/data stored in the member profile and/or account corresponding to the consuming member, and/or the like, a minimum assurance level and/or quality measure of instances of information/data the users associated with the consuming member are interested in accessing. The instances of information/data returned to the user for browsing and/or as search results each have an assurance level and/or quality measure that is at least the minimum assurance level indicated by the user and/or the member profile and/or account corresponding to the consuming member associated with the user. The user may then select a particular instance of information/data of interest based on the user's browsing and/or searching of the instances of information/data available via the distributed ledger.

Thus, input indicating user-selection of an instance of information/data and/or an indication of a user-selected instance of information/data may be received at step/operation 702. For example, a consuming member computing entity 200C may receive input indicating user-selection of an instance of information/data. In an example embodiment, for example, when the consuming member computing entity 200C is not a node of the distributed ledger, another member computing entity 200 (e.g., that is a node of the distributed ledger) may receive an indication of user-selection of an instance of information/data. For example, the user computing entity 30 and/or consuming member computing entity 200C may provide an indication of a user-selected instance of information/data such that a consuming member computing entity 200C and/or another member computing entity 200 receives the indication of the user-selected instance of information/data.

At step/operation 704, a data access cost is determined for the user-selected instance of information/data. In an example embodiment, when a consuming member requests to access a user-selected instance of information/data, a data access cost is determined based on the current value of the instance of information/data. For example, the consuming member computing entity 200C and/or another member computing entity 200 may determine a data access cost for the user-selected instance of information/data based on the current value of the user-selected instance of information/data. As described above, the value of an instance of information/data may be time dependent based on the remaining lifetime (or TTL) of the instance of information/data and/or a relevant depreciation policy/protocol of the distributed ledger. Thus, the current value of the user-selected instance of information/data is the time dependent value of the user-selected instance of information/data at the time the indication of the user-selected instance of information/data was received (e.g., given the remaining lifetime (or TTL) of the instance of information/data and/or the depreciation policy/protocol of the distributed ledger). In an example embodiment, the data access cost for a user-selected instance of information/data is equal to the value for the user-selected instance of information/data. In an example embodiment, the data access cost for a user-selected instance of information/data is equal to and/or determined based on the value of the user-selected instance of information/data when the value of the user-selected instance of information/data is above a predetermined/configurable freely available value $V_{free}$ and the data access cost for the user-selected instance of information/data is set to zero when the value of the user-selected instance of information/data is equal to or less than a predetermined/configurable freely available value $V_{free}$.

In a scenario where the data access cost for the user-selected instance of information/data is zero, the process may skip to step/operation 710. In a scenario where the data access costs for the user-selected instance of information/data is greater than zero, the process continues to step/operation 706. At step/operation 706, one or more exchange tokens are identified from the tokens attributed to the consuming member. For example, the consuming member computing entity 200C and/or another member computing entity 200 may identify the tokens that are indicated as being owned by the consuming member, that are stored in the token wallet corresponding to the consuming member, and/or the like. One or more tokens have a combined value of at least the data access cost for the user-selected instance of information/data are selected to be the exchange tokens. The exchange tokens are exchanged for the consuming member's access to the user-selected instance of information/data. In an example embodiment, the consuming member selects the one or more tokens that are to be the exchange tokens. For example, a user (e.g., human user and/or machine user) operating the user computing entity 30 in communication with the consuming member computing entity 200C and/or operating the consuming member computing entity 200C selects one or more tokens from the tokens owned by and/or attributed to the consuming member to be the exchange tokens for accessing the user-selected instance of information/data. In an example embodiment, the oldest tokens owned by and/or attributed to the consuming member are automatically selected to be the exchange tokens for accessing the user-selected instance of information/data. In an example embodiment, the tokens owned by and/or attributed to the consuming member that have the smallest current redeemable value and/or that expire soonest (e.g., the value attributed to the token reaches zero the soonest) are automatically selected to be the exchange tokens for accessing the user-selected instance of information/data. In various embodiments, various strategies may be used to select one or more tokens owned by and/or attributed to the consuming member to be the exchange tokens for accessing the user-selected instance of information/data. In various embodiments, the current value (e.g., value at the time the indication of the user-selected instance of information/data is received) of one or more tokens owned by and/or attributed to the consuming member may be determined in order to guide the selection of the exchange tokens. For example, various tokens may have time dependent values, as described elsewhere herein, thus the current value of one or more tokens may be determined as part of the process of selecting the one or more tokens to be used as the exchange tokens.

At step/operation 708, payment and/or change tokens are generated and attributed. Payment tokens are tokens that are generated and attributed to the supplying member and/or validating member(s) corresponding to the user-selected instance of information/data. For example, the consuming member computing entity 200C and/or another member computing entity 200 that is a node of the distributed ledger may generate and attribute the payment and/or change tokens. A change token is a token that is generated and attributed to the consuming member that has a value corresponding to the remaining and/or residual value of the exchange tokens after the data access cost has been removed therefrom. Thus, the change token is attributed a value of the total value of the exchange tokens minus the data access cost for the user-selected instance of information/data. In an example embodiment, the value of the change token is configured to be time dependent in the same manner as the exchange token that had the residual value. For example, the value of the change token may have the same time dependency and/or expiration date as the exchange token that had the residual value after the data access cost for the user-selected instance of information/data was subtracted therefrom. In an example embodiment, the value of the change token is configured to be time dependent in the same manner as the user-selected instance of information/data. For example, the value of the change token may take on and/or inherit the same time dependency and/or expiration/data as the payment tokens.

In an example embodiment, the payment tokens are attributed values based on the data access cost and the sharing plan for the user-selected instance of information/data. For example, if the data access cost for the user-selected instance of information/data is X, the sharing plan indicates that each validating member is to receive a validation bounty of 5%, and there are four validating members, a payment token is generated and attributed to each of the four validating members having a value of 0.05*X and a payment token is generated and attributed to the supplying member having a value of X−4*0.05*X or 0.8*X. In an example embodiment, the value of the payment tokens is time dependent in the same manner as the value of the user-selected instance of information/data. For example, the payment tokens may expire (e.g., have a zero value) once the user-selected instance of information/data reaches the end of its lifetime, in an example embodiment. In an example embodiment, the payment tokens may have the same time dependency as the exchange token(s) from which the value was taken to generate the payment tokens. In an example embodiment, the payment tokens may have the same time dependency as the value of the user-selected instance of information/data. In various embodiments, the total value of the payment tokens and change token(s) generated amount to the value of the one or more exchange tokens. In an example embodiment, the payment tokens have been previously generated and may already have been assigned an initial value (for example at blocks 506 and 514). In such an embodiment, step/operation 708 may include realizing the value of the payment tokens and/or making the value of the tokens redeemable. For example, in an example embodiment, the payment token(s) may be supplier token and validator token(s) corresponding to the user-selected instance of information/data that were previously generated and attributed a value. For example, the generation and attribution of the payment token(s), in an example embodiment, may comprise causing the value attributed to the supplier token and any validator tokens corresponding to the user-selected instance of information/data being redeemable.

In an example embodiment, only the first consuming member pays (e.g., provides exchange token(s)) to access the user-selected instance of information/data. For example, the second consuming member to access the user-selected instance of information/data may access the user-selected instance of information/data for free (e.g., at a data access costs of zero). In an example embodiment, each consuming member that accesses the user-selected instance of information/data while the free access criteria is not satisfied (e.g., while the time dependent value of the user-selected instance of information/data is greater than the freely available value $V_{free}$) exchanges tokens and/or value for accessing the user-selected information/data. The supplying member and/or validating members may then receive payment tokens each time a consuming member accesses the user-selected instance of information/data while the free access criteria is not satisfied.

At step/operation 710, access to the user-selected instance of information/data is provided. For example, the consuming member computing entity 200C and/or another member computing entity 200 that is a node of the distributed ledger may provide the user-selected instance of information/data for use by a human and/or machine user of the user computing entity 30 and/or the consuming member computing entity 200C. For example, the user-selected instance of information/data may be read from the distributed ledger and provided for use by a human and/or machine user of the user computing entity 30 and/or the consuming member computing entity 200C. For example, the user-selected instance of information/data may be provided as input to an application, operation, program and/or the like being executed on the user computing entity 30 and/or consuming member computing entity 200C or the user-selected instance of information/data (and/or a portion or representation thereof) may be provided via an interactive user interface of the user computing entity 30 (e.g., display 316, a speaker, and/or the like).

d. Reputation

In various embodiments, the value of an instance of information/data is dependent upon the reputation of the supplying member and/or one or more validating members that validated the instance of information/data. In various embodiments, when an entity becomes a member of the distributed ledger, the member is assigned a neutral reputation. For example, a reputation indicator indicating a neutral reputation may be stored in association with the member profile and/or account corresponding to the member. As a member submits instances of information/data that are validated and/or participates in validating instances of information/data that are also validated by other members, the reputation of the member may be increased to a more positive reputation. For example, a reputation indicator indicating a positive reputation may be stored in association with the member profile and/or account corresponding to the member. If the member submits instances of information/data that validating members indicate include one or more errors and/or that consuming members report as being incorrect, the reputation of the member may be downgraded. In an example embodiment, a consuming member may provide feedback indicating one or more errors and/or issues with an instance of information/data that the consumer accessed. In response to receiving negative feedback from a consuming member regarding an instance of information/data, the reputation of the supplying member and any validating members associated with the instance of information/data may be downgraded. For example, the reputation of the member may become less positive or negative. In an example embodiment, a member's reputation may be selected from the scale positive, neutral, negative. In an example embodiment, a member's reputation may be selected from a scale of one to ten, negative ten to positive ten, one to five, negative five to positive five, zero to one hundred, and/or the like.

e. Technical Advantages

Various embodiments provide a variety of technical improvements over traditional distributed ledger processes. For example, various embodiments provide a technical solution to the technical problem of accommodating a time dependent value and/or usefulness of a data asset (e.g., an instance of information/data) within a distributed ledger. In various embodiments, the technical solution comprises allowing the distributed ledger to attribute tokens with a time dependent value and/or allowing access to instances of information/data at a time dependent data access cost. In an example embodiment, the time dependency of the value of tokens and/or instances of information/data and/or data access costs may be used to manage an economy that exists within the distributed ledger and/or to provide stabile correspondence between the value of tokens and/or data access costs within the distributed ledger and a fiat or commodity currency. In an example embodiment, access to an instance of information/data may be provided for free (e.g., at no cost) even when the value of the instance of information/data is greater than zero (e.g., but less than freely available value $V_{free}$). In an example embodiment, the time dependency of a value of an instance of information/data, a token, and/or a data access cost is controlled using a smart contract, a programmable token, and/or the like. Thus, various embodiments provide a tokenization of a time dependent value of an instance of information/data through the use of a distributed ledger token to create a self-sustaining ecosystem within a public good scenario.

f. Some Example Use Cases

An example use case of an example embodiment is monitoring the degree of development for a plot of land for tax assessment and investment purposes. For example, the quality of an instance of information/data may be based on the credentials and/or reputation of the supplying member providing the instance of information/data regarding the state of the plot of land. The timeliness may be determined in terms of months due to the relatively slow rate of improvements made to land. The reputation of members may be determined based on several years of assessments and their market accuracy. The lifetime of an instance of information/data may be determined based on the tax assessment cadence. For example, the maximum lifetime $L_{max}$ may be a year. For example, it may not be necessary to have validating members validate an instance of information/data if the supplying members reputation is positive.

Another example use case of an example embodiment is the management of demographics and/or contact information/data of healthcare providers maintained by insurance companies. The quality of an instance of information/data may be determined based on the completeness of the instance of information/data and the consistency of details within the instance of information/data. For example, if the instance of information/data only includes the seven digit phone number (rather than the ten digit phone number) for a healthcare provider, the completeness of the instance of information/data may be lower than if the instance of information/data included the ten digit phone number for the healthcare provider. The consistency of details may be determined by confirming that the street address is consistent with the zip code, that the zip code is consistent with the area code of the phone number, and/or the like. The timeliness of an instance of information/data may be determined by a comparison of an effective date of the change in healthcare provider demographic and/or contact information/data and the date the instance of information/data was submitted. The reputation of members may be determined based on the number and quality of submitted instance of information/data and/or feedback provided by consuming members. The lifetime of an instance of information/data may be determined based on the regulatory requirements for healthcare provider directories (e.g., as mandated by the Centers for Medicare & Medicaid Services (CMS)). For example, the lifetime of an instance of information/data may be in the range of weeks to months. For example, the quality assurance threshold requirement may be set such that at least one validating member must validate the instance of information/data before the instance of information/data is made available for access via the distributed ledger.

Another example use case of an example embodiment is the monitoring of the freshness of food in a supply chain. The quality of an instance of information/data may be determined based on the temperature, humidity, container integrity and/or the like of a container containing food items and that is may be acquired through remote sensors (e.g., sensors located at the location of the container). The timeliness may be bounded by hours due to the rate at which the quality of food items may degrade if not maintained under appropriate conditions. The reputation of a member may be determined based on the confirmation that the sensor supplying the measurement is a known device (e.g., a supplying member may be a sensor and/or be associated with one or more sensors). The lifetime of an instance of information/data may be based on the longevity of a given food item type and the transit time to the next stop in the supply chain. The assurance level associated with an instance of information/data may be determined based on the number of sensors within the container.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing access to data in a distributed ledger system, the method comprising:
   receiving an instance of data to which access can be provided in a distributed ledger system, the instance of data (a) submitted by a supplying member computing entity corresponding to a supplying member, (b) configured to be accessed by a consuming member computing entity corresponding to a consuming member, and (c) associated with a configurable time to live;

generating a supplier token for the instance of data;

attributing the supplier token for the instance of data to an account corresponding to the supplying member;

attributing a value to the supplier token, wherein the value of the supplier token changes with time based at least in part on (a) a remaining time to live of the configurable time to live, (b) a depreciation protocol corresponding to the distributed ledger system, or (c) a combination of the remaining time to live of the configurable time to live and the depreciation protocol corresponding to the distributed ledger system;

enabling, based at least in part on the value of the supplier token, access to the instance of data via the distributed ledger system;

receiving an indication that a consuming member has selected to access the instance of data;

determining a data access cost for the instance of data based at least in part on a time dependent value of the instance of data; and providing a consuming member computing entity associated with the consuming member with access to the instance of data based at least in part on an exchange of value amounting to the data access cost from exchange tokens owned by the consuming member to one or more payment tokens, at least one payment token attributed to the supplying member.

2. The method of claim 1, further comprising:

receiving a validation response validating the instance of data from at least one validating member computing entity associated with a validating member of the distributed ledger system; and updating an assurance level associated with the instance of data based at least in part on the validation response, wherein the instance of data is not made available for access via the distributed ledger system until the assurance level associated with the instance of data satisfies a quality assurance threshold requirement.

3. The method of claim 2, wherein the value is attributed to the supplier token in response to the assurance level associated with the instance of data satisfying the quality assurance threshold requirement.

4. The method of claim 1, further comprising determining a quality measure corresponding to the instance of data, wherein the value of the supplier token is determined at least in part based at least in part on the quality measure.

5. The method of claim 1, wherein the value of the supplier token is determined at least in part on at least one of (a) a reputation of the supplying member within the distributed ledger system or (b) a timeliness of the instance of data.

6. The method of claim 1, wherein the at least one payment token attributed to the supplying member is the supplier token and the exchange of value causes the value attributed to the supplier token to be redeemable.

7. The method of claim 1, wherein when the time dependent value reaches a freely available value, the data access cost is zero.

8. The method of claim 7, wherein freely available value is determined based at least in part on at least one of a quality associated with the instance of data, an assurance level associated with the instance of data, or a remaining lifetime for the instance of data.

9. An apparatus comprising at least one processor, at least one communications interface, and at least one memory including computer program code, the apparatus being a node of a plurality of nodes storing a distributed ledger system, the at least one memory and computer program code configured to, with the processor, cause the apparatus to at least:

receive an instance of data to which access can be provided in a distributed ledger system, the instance of data (a) submitted by a supplying member computing entity corresponding to a supplying member, (b) configured to be accessed by a consuming member computing entity corresponding to a consuming member, and (c) associated with a configurable time to live;

generate a supplier token for the instance of data;

attribute the supplier token for the instance of data to an account corresponding to the supplying member;

attribute a value to the supplier token, wherein the value of the supplier token changes with time based at least in part on (a) a remaining time to live of the configurable time to live, (b) a depreciation protocol corresponding to the distributed ledger system, or (c) a combination of the remaining time to live of the configurable time to live and the depreciation protocol corresponding to the distributed ledger system;

enable, based at least in part on the value of the supplier token, access to the instance of data via the distributed ledger system;

receive an indication that a consuming member has selected to access the instance of data;

determine a data access cost for the instance of data based at least in part on a time dependent value of the instance of data; and provide a consuming member computing entity associated with the consuming member with access to the instance of data based at least in part on an exchange of value amounting to the data access cost from exchange tokens owned by the consuming member to one or more payment tokens, at least one payment token attributed to the supplying member.

10. The apparatus of claim 9, wherein the at least one memory and computer program code are further configured to, with the processor, cause the apparatus to at least:

receive a validation response validating the instance of data from at least one validating member computing entity associated with a validating member of the distributed ledger system; and update an assurance level associated with the instance of data based at least in part on the validation response, wherein the instance of data is not made available for access via the distributed ledger system until the assurance level associated with the instance of data satisfies a quality assurance threshold requirement.

11. The apparatus of claim 10, wherein the value is attributed to the supplier token in response to the assurance level associated with the instance of data satisfying the quality assurance threshold requirement.

12. The apparatus of claim 9, wherein the at least one memory and computer program code are further configured to, with the processor, cause the apparatus to at least determine a quality measure corresponding to the instance of data, wherein the value of the supplier token is determined at least in part based at least in part on the quality measure.

13. The apparatus of claim 9, wherein the value of the supplier token is determined at least in part on at least one of (a) a reputation of the supplying member within the distributed ledger system or (b) a timeliness of the instance of data.

14. The apparatus of claim 9, wherein the at least one payment token attributed to the supplying member is the supplier token and the exchange of value causes the value attributed to the supplier token to be redeemable.

15. A computer program product comprising at least one non-transitory computer-readable storage medium having computer-executable program code portions stored therein, the computer-executable program code portions, when executed by a processor of a member computing entity, the member computing entity being a node of a distributed ledger system, are configured to cause the member computing entity to at least:
  receive an instance of data to which access can be provided in a distributed ledger system, the instance of data (a) submitted by a supplying member computing entity corresponding to a supplying member, (b) configured to be accessed by a consuming member computing entity corresponding to a consuming member, and (c) associated with a configurable time to live;
  generate a supplier token for the instance of data;
  attribute the supplier token for the instance of data to an account corresponding to the supplying member;
  attribute a value to the supplier token, wherein the value of the supplier token changes with time based at least in part on (a) a remaining time to live of the configurable time to live, (b) a depreciation protocol corresponding to the distributed ledger system, or (c) a combination of the remaining time to live of the configurable time to live and the depreciation protocol corresponding to the distributed ledger system;
  enable, based at least in part on the value of the supplier token, access to the instance of data via the distributed ledger system;
  receive an indication that a consuming member has selected to access the instance of data;
  determine a data access cost for the instance of data based at least in part on a time dependent value of the instance of data; and
  provide a consuming member computing entity associated with the consuming member with access to the instance of data based at least in part on an exchange of value amounting to the data access cost from exchange tokens owned by the consuming member to one or more payment tokens, at least one payment token attributed to the supplying member.

16. The computer program product of claim 15, wherein the computer-executable program code portions, when executed by the processor of the member computing entity, are further configured to cause the member computing entity to at least:
  receive a validation response validating the instance of data from at least one validating member computing entity associated with a validating member of the distributed ledger system; and
  update an assurance level associated with the instance of data based at least in part on the validation response,
  wherein the instance of data is not made available for access via the distributed ledger system until the assurance level associated with the instance of data satisfies a quality assurance threshold requirement.

17. The computer program product of claim 16, wherein the value is attributed to the supplier token in response to the assurance level associated with the instance of data satisfying the quality assurance threshold requirement.

18. The computer program product of claim 15, wherein the computer-executable program code portions, when executed by the processor of the member computing entity, are further configured to cause the member computing entity to at least determine a quality measure corresponding to the instance of data, wherein the value of the supplier token is determined at least in part based at least in part on the quality measure.

19. The computer program product of claim 15, wherein the value of the supplier token is determined at least in part on at least one of (a) a reputation of the supplying member within the distributed ledger system or (b) a timeliness of the instance of data.

20. The computer program product of claim 15, wherein the at least one payment token attributed to the supplying member is the supplier token and the exchange of value causes the value attributed to the supplier token to be redeemable.

* * * * *